(12) United States Patent
Martinez Ramirez et al.

(10) Patent No.: US 12,334,043 B2
(45) Date of Patent: Jun. 17, 2025

(54) TIME-VARYING AND NONLINEAR AUDIO PROCESSING USING DEEP NEURAL NETWORKS

(71) Applicant: WAVESHAPER TECHNOLOGIES INC., Montreal (CA)

(72) Inventors: Marco Antonio Martinez Ramirez, London (GB); Joshua Daniel Reiss, London (GB); Emmanouil Benetos, London (GB)

(73) Assignee: WAVESHAPER TECHNOLOGIES INC., Montreal (CA)

( * ) Notice: Subject to any disclaimer, the term of this patent is extended or adjusted under 35 U.S.C. 154(b) by 129 days.

(21) Appl. No.: 17/924,701

(22) PCT Filed: May 12, 2020

(86) PCT No.: PCT/GB2020/051150
§ 371 (c)(1),
(2) Date: Nov. 11, 2022

(87) PCT Pub. No.: WO2021/229197
PCT Pub. Date: Nov. 18, 2021

(65) Prior Publication Data
US 2023/0197043 A1    Jun. 22, 2023

(51) Int. Cl.
*G10H 1/00* (2006.01)
*G06N 3/0442* (2023.01)
(Continued)

(52) U.S. Cl.
CPC ......... *G10H 1/0091* (2013.01); *G06N 3/0442* (2023.01); *G06N 3/045* (2023.01);
(Continued)

(58) Field of Classification Search
CPC .. G10H 1/0091; G10H 1/16; G10H 2210/215; G10H 2210/281;
(Continued)

(56) References Cited

U.S. PATENT DOCUMENTS 10,068,557 B1 * 9/2018 Engel ..................... G06N 3/045

FOREIGN PATENT DOCUMENTS

JP         202027245 A    2/2020

OTHER PUBLICATIONS

Martinez et al.; Modeling Plate and Spring Reverberation Using a DSP-Informed Deep Neural Network; (Year: 2019).*
(Continued)

*Primary Examiner* — Andrew Sniezek
(74) *Attorney, Agent, or Firm* — FASKEN MARTINEAU DuMOULIN LLP; Johann Gest; Dennis Haszko

(57) ABSTRACT

A computer-implemented method of processing audio data, the method comprising receiving input audio data (x) comprising a time-series of amplitude values; transforming the input audio data (x) into an input frequency band decomposition (X1) of the input audio data (x); transforming the input frequency band decomposition (X1) into a first latent representation (Z); processing the first latent representation (Z) by a first deep neural network to obtain a second latent representation (Z^, Z1^); transforming the second latent representation (Z^, Z1^) to obtain a discrete approximation (X3^); element-wise multiplying the discrete approximation (X3^) and a residual feature map (R, X5^) to obtain a modified feature map, wherein the residual feature map (R, X5^) is derived from the input frequency band decomposition (X1); processing a pre-shaped frequency band decomposition by a waveshaping unit to obtain a waveshaped frequency band decomposition (X1^, X1.2^), wherein the pre-shaped frequency band decomposition is derived from
(Continued)

Figure 1A:
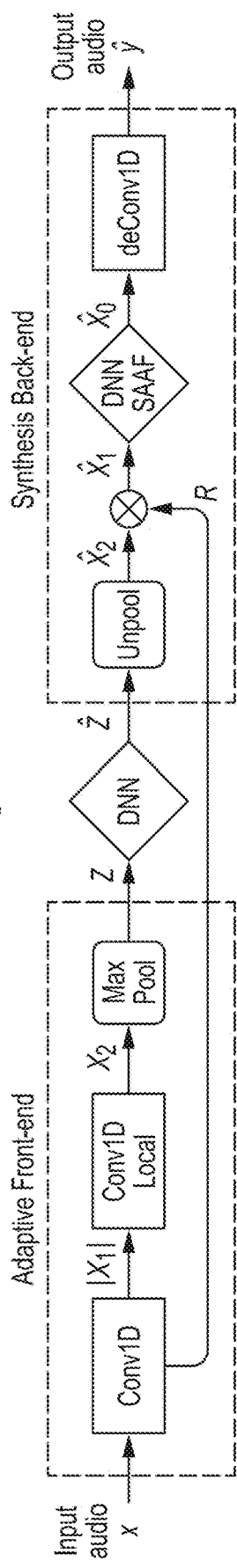

the input frequency band decomposition (X1), wherein the waveshaping unit comprises a second deep neural network; summing the waveshaped frequency band decomposition (X1^, X1.2^) and a modified frequency band decomposition (X2^, X1.1^) to obtain a summation output (X0^), wherein the modified frequency band decomposition (X2^, X1.1^) is derived from the modified feature map; and transforming the summation output (X0^) to obtain target audio data (y^).

20 Claims, 8 Drawing Sheets

(51) Int. Cl.
    *G06N 3/045*     (2023.01)
    *G06N 3/0499*     (2023.01)
    *G06N 3/08*     (2023.01)
    *G10H 1/16*     (2006.01)

(52) U.S. Cl.
    CPC ............. *G06N 3/0499* (2023.01); *G06N 3/08* (2013.01); *G10H 1/16* (2013.01); *G10H 2210/215* (2013.01); *G10H 2210/281* (2013.01); *G10H 2210/311* (2013.01); *G10H 2250/025* (2013.01); *G10H 2250/311* (2013.01)

(58) Field of Classification Search
    CPC ....... G10H 2210/311; G10H 2250/025; G10H 2250/311; G06N 3/0499; G06N 3/045; G06N 3/0442; G06N 3/08
    See application file for complete search history.

(56) References Cited

OTHER PUBLICATIONS

Martinez et al.; A General-Purpose Deep Learning Approach to Model Time-Varying Audio Efects (Year: 2019).*

Martinez et al.; Deep Leaning for Black-Box Modeling of Audio Efects (Year: 2020).*

Stephan Möller, Martin Gromowski, and Udo Zölzer. A measurement technique for highly nonlinear transfer functions. In 5th International Conference on Digital Audio Effects (DAFx-02), Sep. 26-28, 2002.

Filip Korzeniowski and Gerhard Widmer. Feature learning for chord recognition: The deep chroma extractor. In 17th International Society for Music Information Retrieval Conference (ISMIR), 2016.

Oliver Kröning, Kristjan Dempwolf, and Udo Zölzer. Analysis and simulation of an analog guitar compressor. In 14th International Conference on Digital Audio Effects (DAFx-11), 2011.

Walter Kuhl. The acoustical and technological properties of the reverberation plate. E. B. U. Review, 49, 1958.

Yann A LeCun, Léon Bottou, Genevieve B Orr, and Klaus-Robert Müller. Efficient backprop. Neural networks: Tricks of the trade, pp. 9-48, 2012.

Honglak Lee, Peter Pham, Yan Largman, and Andrew Y Ng. Unsupervised feature learning for audio classification using convolutional deep belief networks. In Advances in neural information processing systems, pp. 1096-1104, 2009.

Jongpil Lee, Jiyoung Park, Keunhyoung Luke Kim, and Juhan Nam. SampleCNN: End-to-end deep convolutional neural networks using very small filters for music classification. Applied Sciences, 8(1):150, 2018.

Keun Sup Lee, Nicholas J Bryan, and Jonathan S Abel. Approximating measured reverberation using a hybrid fixed/switched convolution structure. In 13th International Conference on Digital Audio Effects (DAFx-10), 2010.

Teck Yian Lim, Raymond A Yeh, Yijia Xu, Minh N Do, and Mark Hasegawa-Johnson. Time-frequency networks for audio super-resolution. In IEEE Inter-national Conference on Acoustics, Speech and Signal Processing (ICASSP), 2018.

Jaromír Macák. Simulation of analog flanger effect using BBD circuit. In 19th International Conference on Digital Audio Effects (DAFx-16), 2016.

Jacob A Maddams, Saoirse Finn, and Joshua D Reiss. An autonomous method for multi-track dynamic range compression. In 15th International Conference on Digital Audio Effects (DAFx-12), 2012.

EP Matthew Davies and Sebastian Bock. Temporal convolutional networks for musical audio beat tracking. In 27th IEEE European Signal Processing Conference (EUSIPCO), 2019.

Daniel Matz, Estefanía Cano, and Jakob Abeßer. New sonorities for early jazz recordings using sound source separation and automatic mixing tools. In 16th International Society for Music Information Retrieval Conference (ISMIR), 2015.

Josh H McDermott and Eero P Simoncelli. Sound texture perception via statistics of the auditory periphery: evidence from sound synthesis. Neuron, 71, 2011.

Martin McKinney and Jeroen Breebaart. Features for audio and music classification. In 4th International Society for Music Information Retrieval Conference (ISMIR), 2003.

Soroush Mehri, Kundan Kumar, Ishaan Gulrajani, Rithesh Kumar, Shubham Jain, Jose Sotelo, Aaron Courville, and Yoshua Bengio. SampleRNN: An unconditional end-to-end neural audio generation model. In 5th International Conference on Learning Representations. ICLR, 2017.

Stephan Möller, Martin Gromowski, and Udo Zölzer. A measurement technique for highly nonlinear transfer functions. In 5th International Conference on Digital Audio Effects (DAFx-02), 2002.

James A Moorer. About this reverberation business. Computer music journal, pp. 13-28, 1979.

Aaron van den Oord, Sander Dieleman, Heiga Zen, Karen Simonyan, Oriol Vinyals, Alex Graves, Nal Kalchbrenner, Andrew Senior, and Koray Kavukcuoglu. Wavenet: A generative model for raw audio. In CoRR abs/1609.03499, 2016.

Jyri Pakarinen and David T Yeh. A review of digital techniques for modeling vacuum-tube guitar amplifiers. Computer Music Journal, 33(2): 85-100, 2009.

Bryan Pardo, David Little, and Darren Gergle. Building a personalized audio equalizer interface with transfer learning and active learning. In 2nd International ACM Workshop on Music Information Retrieval with User-Centered and Multimodal Strategies, 2012.

Julian Parker. Efficient dispersion generation structures for spring reverb emulation. EURASIP Journal on Advances in Signal Processing, 2011a.

Julian Parker. A simple digital model of the diode-based ring-modulator. In 14th International Conference on Digital Audio Effects (DAFx-11), 2011b.

Julian Parker and Stefan Bilbao. Spring reverberation: A physical perspective. In 12th International Conference on Digital Audio Effects (DAFx-09), 2009.

Julian Parker and Fabian Esqueda. Modelling of nonlinear state-space systems using a deep neural network. In 22nd International Conference on Digital Audio Effects (DAFx-19), 2019.

Razvan Pascanu, Tomas Mikolov, and Yoshua Bengio. On the difficulty of training recurrent neural networks. In International Conference on Machine Learning, 2013.

Jussi Pekonen, Tapani Pihlajamaki, and Vesa Välimäki. Computationally efficient hammond organ synthesis. In 14th International Conference on Digital Audio Effects (DAFx-11), 2011.

Enrique Perez-Gonzalez and Joshua D. Reiss. Automatic equalization of multi-channel audio using crossadaptive methods. In 127th Audio Engineering Society Convention, 2009.

Jordi Pons, Oriol Nieto, Matthew Prockup, Erik Schmidt, Andreas Ehmann, and Xavier Serra. End-to-end learning for music audio tagging at scale. In 31st Conference on Neural Information Processing Systems, 2017.

Colin Raffel and Julius O Smith. Practical modeling of bucket-brigade device circuits. In 13th International Conference on Digital Audio Effects (DAFx-10), 2010.

(56) References Cited

OTHER PUBLICATIONS

Jussi Rämö and Vesa Välimäki. Neural third-octave graphic equalizer. In 22nd International Conference on Digital Audio Effects (DAFx-19), 2019.

Dale Reed. A perceptual assistant to do sound equalization. In 5th International Conference on Intelligent User Interfaces, pp. 212-218. ACM, 2000.

Dario Rethage, Jordi Pons, and Xavier Serra. A wavenet for speech denoising. In IEEE International Conference on Acoustics, Speech and Signal Processing (ICASSP), 2018.

Olaf Ronneberger, Philipp Fischer, and Thomas Brox. U-net: Convolutional networks for biomedical image segmentation. In International Conference on Medical Image Computing and Computer-Assisted Intervention, 2015.

Andrew T Sabin and Bryan Pardo. A method for rapid personalization of audio equalization parameters. In 17th ACM International Conference on Multimedia, 2009.

Jan Schlüter and Sebastian Böck. Musical onset detection with convolutional neural networks. In 6th International Workshop on Machine Learning and Music, 2013.

Jan Schlüter and Sebastian Böck. Improved musical onset detection with convolutional neural networks. In IEEE International Conference on Acoustics, Speech and Signal Processing (ICASSP), 2014.

Manfred R Schroeder and Benjamin F Logan. "Colorless" artificial reverberation. IRE Transactions on Audio, (6):209-214, 1961.

Mike Schuster and Kuldip K Paliwal. Bidirectional recurrent neural networks. IEEE transactions on Signal Processing, 45(11):2673-2681, 1997.

Di Sheng and György Fazekas. Automatic control of the dynamic range compressor using a regression model and a reference sound. In 20th International Conference on Digital Audio Effects (DAFx-17), 2017.

Di Sheng and György Fazekas. A feature learning siamese model for intelligent control of the dynamic range compressor. In International Joint Conference on Neural Networks (IJCNN), 2019.

Siddharth Sigtia and Simon Dixon. Improved music feature learning with deep neural networks. In IEEE International Conference on Acoustics, Speech and Signal Processing (ICASSP), 2014.

Siddharth Sigtia, Emmanouil Benetos, Nicolas Boulanger-Lewandowski, Tillman Weyde, Artur S d'Avila Garcez, and Simon Dixon. A hybrid recurrent neural network for music transcription. In IEEE international conference on acoustics, speech and signal processing (ICASSP), 2015.

Siddharth Sigtia, Emmanouil Benetos, and Simon Dixon. An end-to-end neural network for polyphonic piano music transcription. IEEE/ACM Transactions on Audio, Speech, and Language Processing, 24(5):927-939, 2016.

Julius O Smith and Jonathan S Abel. Bark and ERB bilinear transforms. IEEE Transactions on Speech and Audio Processing, 7(6):697-708, 1999.

Julius O Smith, Stefania Serafin, Jonathan Abel, and David Berners. Doppler simulation and the leslie. In 5th International Conference on Digital Audio Effects (DAFx-02), 2002.

Mirko Solazzi and Aurelio Uncini. Artificial neural networks with adaptive multi-dimensional spline activation functions. In IEEE International Joint Conference on Neural Networks (IJCNN), 2000.

Karl Steinberg. Steinberg virtual studio technology (VST) plug-in specification 2.0 software development kit. Hamburg: Steinberg Soft-und Hardware GMBH, 1999.

Dan Stowell and Mark D Plumbley. Automatic large-scale classification of bird sounds is strongly improved by unsupervised feature learning. PeerJ, 2:e488, 2014.

Bob L Sturm, Joao Felipe Santos, Oded Ben-Tal, and Iryna Korshunova. Music transcription modelling and composition using deep learning. In 1st Conference on Computer Simulation of Musical Creativity, 2016.

Somsak Sukittanon, Les E Atlas, and James W Pitton. Modulation-scale analysis for content identification. IEEE Transactions on Signal Processing, 52, 2004.

Anish Athalye, Nicholas Carlini, and David Wagner. Obfuscated gradients give a false sense of security: circumventing defenses to adversarial examples. In International Conference on Machine Learning, 2018.

Shaojie Bai, J Zico Kolter, and Vladlen Koltun. Convolutional sequence modeling revisited. In 6th International Conference on Learning Representations (ICLR), 2018.

Stefan Bilbao. Numerical simulation of spring reverberation. In 16th International Conference on Digital Audio Effects (DAFx-13), 2013.

Stefan Bilbao and Julian Parker. A virtual model of spring reverberation. IEEE Transactions on Audio, Speech and Language Processing, 18(4):799-808, 2009.

Stefan Bilbao, Kevin Arcas, and Antoine Chaigne. A physical model for plate reverberation. In IEEE International Conference on Acoustics, Speech, and Signal Processing, 2006.

Merlijn Blaauw and Jordi Bonada. A neural parametric singing synthesizer. In Interspeech, 2017.

Ólafur Bogason and Kurt James Werner. Modeling circuits with operational transconductance amplifiers using wave digital filters. In 20th International Conference on Digital Audio Effects (DAFx-17), 2017.

Sharan Chetlur, Cliff Woolley, Philippe Vandermersch, Jonathan Cohen, John Tran, Bryan Catanzaro, and Evan Shelhamer. cuDNN: Efficient primitives for deep learning. CoRR, abs / 1410.0759, 2014.

Kyunghyun Cho, Bart Van Merriënboer, Caglar Gulcehre, Dzmitry Bahdanau, Fethi Bougares, Holger Schwenk, and Yoshua Bengio. Learning phrase repre-sentations using RNN encoder-decoder for statistical machine translation. arXiv preprint arXiv: 1406. 1078, 2014.

Eero-Pekka Damskägg, Lauri Juvela, Etienne Thuillier, and Vesa Välimäki. Deep learning for tube amplifier emulation. In IEEE International Conference on Acous-tics, Speech, and Signal Processing (ICASSP), 2019.

Brecht De Man, Joshua D Reiss, and Ryan Stables. Ten years of automatic mixing. In Proceedings of the 3rd Workshop on Intelligent Music Production, 2017.

Michele Ducceschi and Craig J Webb. Plate reverberation: Towards the development of a real-time physical model for the working musician. In International Congress on Acoustics (ICA), 2016.

John Duchi, Elad Hazan, and Yoram Singer. Adaptive subgradient methods for online learning and stochastic optimization. Journal of machine learning research, (Jul. 12):2121-2159, 2011.

Simon Durand, Juan P Bello, Bertrand David, and Gaël Richard. Downbeat tracking with multiple features and deep neural networks. In IEEE International Conference on Acoustics, Speech and Signal Processing (ICASSP), 2015.

Douglas Eck and Juergen Schmidhuber. A first look at music composition using lstm recurrent neural networks. Istituto Dalle Molle Di Studi Sull Intelligenza Artificiale, 103, 2002.

Felix Eichas and Udo Zolzer. Black-box modeling of distortion circuits with block- oriented models. In 19th International Conference on Digital Audio Effects (DAFx-16), 2016.

Felix Eichas and Udo Zölzer. Virtual analog modeling of guitar amplifiers with wiener-hammerstein models. In 44th Annual Convention on Acoustics, 2018.

Felix Eichas, Marco Fink, Martin Holters, and Udo Zölzer. Physical modeling of the mxr phase 90 guitar effect pedal. In 17th International Conference on Digital Audio Effects (DAFx-14), 2014.

Jesse Engel, Cinjon Resnick, Adam Roberts, Sander Dieleman, Mohammad Norouzi, Douglas Eck, and Karen Simonyan. Neural audio synthesis of musical notes with wavenet autoencoders. 34th International Conference on Machine Learning, 2017.

Jesse Engel, Lamtharn Hantrakul, Chenjie Gu, and Adam Roberts. DDSP: Differentiable digital signal processing. In 8th International Conference on Learning Representations (ICLR), 2020.

Angelo Farina. Simultaneous measurement of impulse response and distortion with a swept-sine technique. In 108th Audio Engineering Society Convention, 2000.

Xue Feng, Yaodong Zhang, and James Glass. Speech feature denoising and dereverberation via deep autoencoders for noisy reverberant speech recognition. In IEEE International Conference on Acoustics, Speech, and Signal Processing, 2014.

(56) References Cited

OTHER PUBLICATIONS

Todor Ganchev, Nikos Fakotakis, and George Kokkinakis. Comparative evaluation of various mfcc implementations on the speaker verification task. In International Conference on Speech and Computer, 2005.
Felix A Gers, Jürgen Schmidhuber, and Fred Cummins. Learning to forget: Continual prediction with LSTM. IET, 1999.
Dimitrios Giannoulis, Michael Massberg, and Joshua D Reiss. Parameter automation in a dynamic range compressor. Journal of the Audio Engineering Society, 61 (10):716-726, 2013.
Xavier Glorot and Yoshua Bengio. Understanding the difficulty of training deep feedforward neural networks. In the 13th International Conference on Artificial Intelligence and Statistics, 2010.
Luke B Godfrey and Michael S Gashler. A continuum among logarithmic, linear, and exponential functions, and its potential to improve generalization in neural networks. In 7th IEEE International Joint Conference on Knowledge Discovery, Knowledge Engineering and Knowledge Management, 2015.
Alex Graves and Jürgen Schmidhuber. Framewise phoneme classification with bidirectional lstm and other neural network architectures. Neural Networks, 18 (5-6):602-610, 2005.
Alex Graves, Abdel-rahman Mohamed, and Geoffrey Hinton. Speech recognition with deep recurrent neural networks. In IEEE International Conference on Acous-tics, Speech, and Signal Processing (ICASSP), 2013.
Anna Hagenblad. Aspects of the identification of Wiener models. PhD thesis, Linköpings Universitet, 1999.
Philippe Hamel, Matthew EP Davies, Kazuyoshi Yoshii, and Masataka Goto. Transfer learning in MIR: Sharing learned latent representations for music audio classification and similarity. In 14th International Society for Music Information Retrieval Conference (ISMIR), 2013.
Kun Han, Yuxuan Wang, DeLiang Wang, William S Woods, Ivo Merks, and Tao Zhang. Learning spectral mapping for speech dereverberation and denoising. IEEE Transactions on Audio, Speech and Language Processing, 23(6):982-992, 2015.
Yoonchang Han, Jaehun Kim, and Kyogu Lee. Deep convolutional neural networks for predominant instrument recognition in polyphonic music. IEEE/ACM Transactions on Audio, Speech, and Language Processing, 25 (1):208-221, 2016.
Scott H Hawley, Benjamin Colburn, and Stylianos I Mimilakis. SignalTrain: Profiling audio compressors with deep neural networks. In 147th Audio Engineering Society Convention, 2019.
Kaiming He, Xiangyu Zhang, Shaoqing Ren, and Jian Sun. Deep residual learning for image recognition. In IEEE Conference on Computer Vision and Pattern Recognition, 2016.
Thomas Helie. On the use of volterra series for real-time simulations of weakly nonlinear analog audio devices: Application to the moog ladder filter. In 9th International Conference on Digital Audio Effects (DAFx-06), 2006.
Marcel Hilsamer and Stephan Herzog. A statistical approach to automated offline dynamic processing in the audio mastering process. In 17th International Conference on Digital Audio Effects (DAFx-14), 2014.
Sepp Hochreiter and Jürgen Schmidhuber. Long short-term memory. Neural computation, 9(8):1735-1780, 1997.
Martin Holters and Julian D Parker. A combined model for a bucket brigade device and its input and output filters. In 21st International Conference on Digital Audio Effects (DAFx-17), 2018.
Martin Holters and Udo Zölzer. Physical modelling of a wah-wah effect pedal as a case study for application of the nodal dk method to circuits with variable parts. In 14th International Conference on Digital Audio Effects (DAFx-11), 2011.
Le Hou, Dimitris Samaras, Tahsin M Kurc, Yi Gao, and Joel H Saltz. Neural networks with smooth adaptive activation functions for regression. arXiv preprint arXiv:1608.06557, 2016.
Le Hou, Dimitris Samaras, Tahsin M Kurc, Yi Gao, and Joel H Saltz. Convnets with smooth adaptive activation functions for regression. In 20th International Conference on Artificial Intelligence and Statistics (AISTATS), 2017.
Jie Hu, Li Shen, and Gang Sun. Squeeze-and-excitation networks. In IEEE Conference on Computer Vision and Pattern Recognition, 2018.
Allen Huang and Raymond Wu. Deep learning for music. CoRR, abs / 1606.04930, 2016.
Eric J Humphrey and Juan P Bello. From music audio to chord tablature: Teaching deep convolutional networks to play guitar. In IEEE international conference on acoustics, speech and signal processing (ICASSP), 2014.
Antti Huovilainen. Enhanced digital models for analog modulation effects. In 8th International Conference on Digital Audio Effects (DAFx-05), 2005.
Nicholas Jillings, Brecht De Man, David Moffat, and Joshua D Reiss. Web Audio Evaluation Tool: A browser-based listening test environment. In 12th Sound and Music Computing Conference, 2015.
Roope Kiiski, Fabian Esqueda, and Vesa Välimäki. Time-variant gray-box modeling of a phaser pedal. In 19th International Conference on Digital Audio Effects (DAFx-16), 2016.
Taejun Kim, Jongpil Lee, and Juhan Nam. Sample-level CNN architectures for music auto-tagging using raw waveforms. In IEEE International Conference on Acoustics, Speech, and Signal Processing (ICASSP), 2018.
Diederik Kingma and Jimmy Ba. Adam: A method for stochastic optimization. In 3rd International Conference on Learning Representations (ICLR), 2015.
Tijmen Tieleman and Geoffrey Hinton. RMSprop: Divide the gradient by a running average of its recent magnitude. COURSERA: Neural networks for machine learning, 4(2):26-31, 2012.
Aurelio Uncini. Audio signal processing by neural networks. Neurocomputing, 55 (3-4):593-625, 2003.
International Telecommunication Union. Recommendation ITU-R BS. 1534-1: Method for the subjective assessment of intermediate quality level of coding systems. 2003.
Vesa Välimäki and Joshua D. Reiss. All about audio equalization: Solutions and frontiers. Applied Sciences, 6(5):129, 2016.
Aaron Van den Oord, Sander Dieleman, and Benjamin Schrauwen. Deep content-based music recommendation. In Advances in Neural Information Processing Sys-tems, pp. 2643-2651, 2013.
Shrikant Venkataramani, Jonah Casebeer, and Paris Smaragdis. Adaptive front- ends for end-to-end source separation. In 31st Conference on Neural Information Processing Systems, 2017.
Vincent Verfaille, U. Zölzer, and Daniel Arfib. Adaptive digital audio effects (A-DAFx): A new class of sound transformations. IEEE Transactions on Audio, Speech and Language Processing, 14(5):1817-1831, 2006.
Kurt J Werner, W Ross Dunkel, and François G Germain. A computational model of the hammond organ vibrato/chorus using wave digital filters. In 19th International Conference on Digital Audio Effects (DAFx-16), 2016.
Silvin Willemsen, Stefania Serafin, and Jesper R Jensen. Virtual analog simulation and extensions of plate reverberation. In 14th Sound and Music Computing Conference, 2017.
Alec Wright, Eero-Pekka Damskägg, and Vesa Välimäki. Real-time black-box modelling with recurrent neural networks. In 22nd International Conference on Digital Audio Effects (DAFx-19), 2019.
David T Yeh and Julius O Smith. Simulating guitar distortion circuits using wave digital and nonlinear statespace formulations. In 11th International Conference on Digital Audio Effects (DAFx-08), 2008.
David T Yeh, Jonathan S Abel, and Julius O Smith. Automated physical modeling of nonlinear audio circuits for real-time audio effects part I: Theoretical development. IEEE Transactions on Audio, Speech, and Language Processing, 18(4):728-737, 2010.
Matthew D Zeiler and Rob Fergus. Visualizing and understanding convolutional networks. In European conference on computer vision. Springer, 2014.
Japanese Office Action regarding Application No. 2022-568979, issued Aug. 20, 2024.
Marco A. Martinez Ramirez et al. and "Modeling Nonlinear Audio Effects with End-to-end Deep Neural Networks", [online] and ICASSP 2019—2019 IEEE International Conference on Acoustics,

(56) References Cited

OTHER PUBLICATIONS

Speech and Signal Processing (ICASSP), IEEE, May 12, 2019, pp. 171-175, DOI:10.1109-/ICASSP.2019.8683529.
Eero-Pekka Damskagg et al. and "Deep Learning for Tube Amplifier Emulation", [online] and ICASSP 2019—2019 IEEE International Conference on Acoustics, Speech and Signal Processing (ICASSP), IEEE, May 12, 2019, pp. 471-475, D OI:10.1109/ICASSP.2019.8682805.

* cited by examiner (a)

(b)

(c)

(d)

(e)

(f)

(a)

(b)

TIME-VARYING AND NONLINEAR AUDIO PROCESSING USING DEEP NEURAL NETWORKS

CROSS REFERENCE TO RELATED APPLICATIONS

This application is a U.S. National Phase Application under 35 U.S.C. 371 of International Application No. PCT/GB2020/051150, filed on May 12, 2020. The entire disclosure of the above application is expressly incorporated by reference herein.

TECHNICAL FIELD

The present invention relates to audio processing, in particular audio processing using deep neural networks.

BACKGROUND

Audio effects are widely used in various media such as music, live performances, television, films or video games. In the context of music production, audio effects are mainly used for aesthetic reasons and are usually applied to manipulate the dynamics, spatialisation, timbre or pitch of vocal or instrument recordings. This manipulation is achieved through effect units, or audio processors, that can be linear or nonlinear, time-invariant or time-varying and with short-term or long-term memory.

Most of these effects can be implemented directly in the digital domain through the use of digital filters and delay lines. Nevertheless, modeling specific effect units or analog circuits and their salient perceptual qualities has been heavily researched and remains an active field. This is because their analog circuitry, often together with mechanical elements, yields a nonlinear and time-varying system which is difficult to fully emulate digitally.

Methods for modeling audio effects mainly involve circuit modeling and optimization for specific analog components such as vacuum-tubes, operational amplifiers or transistors. Such audio processors are not easily modeled, requiring complex, customized digital signal processing (DSP) algorithms. This often requires models that are too specific for a certain circuit or making certain assumptions when modeling specific nonlinearities or components. Therefore such models are not easily transferable to different effects units since expert knowledge of the type of circuit being modeled is always required. Also, musicians tend to prefer analog counterparts because their digital implementations may lack the broad behavior of the analog reference devices.

There is a general need to improve on known techniques for the modeling of audio effects.

SUMMARY

There is disclosed a computer-implemented method of processing audio data, the method comprising receiving input audio data (x) comprising a time-series of amplitude values; transforming the input audio data (x) into an input frequency band decomposition (X1) of the input audio data (x); transforming the input frequency band decomposition (X1) into a first latent representation (Z); processing the first latent representation (Z) by a first deep neural network to obtain a second latent representation (Z^, Z1^); transforming the second latent representation (Z^, Z1^) to obtain a discrete approximation (X3^); element-wise multiplying the discrete approximation (X3^) and a residual feature map (R, X5^) to obtain a modified feature map, wherein the residual feature map (R, X5^) is derived from the input frequency band decomposition (X1); processing a pre-shaped frequency band decomposition by a waveshaping unit to obtain a waveshaped frequency band decomposition (X1^, X1.2^), wherein the pre-shaped frequency band decomposition is derived from the input frequency band decomposition (X1), wherein the waveshaping unit comprises a second deep neural network; summing the waveshaped frequency band decomposition (X1^, X1.2^) and a modified frequency band decomposition (X2^, X1.1^) to obtain a summation output (X0^), wherein the modified frequency band decomposition (X2^, X1.1^) is derived from the modified feature map; and transforming the summation output (X0^) to obtain target audio data (y^).

Optionally, transforming the input audio data (x) into the input frequency band decomposition (X1) comprises convolving the input audio data (x) with kernel matrix (W1).

Optionally, transforming the summation output (X0^) to obtain the target audio data (y^) comprises convolving the summation output (X0^) with the transpose of the kernel matrix (W1T).

Transforming the input frequency band decomposition (X1) into the first latent representation (Z) optionally comprises locally-connected convolving the absolute value (|X1|) of the input frequency band decomposition (X1) with a weight matrix (W2) to obtain a feature map (X2); and optionally max-pooling the feature map (X2) to obtain the first latent representation (Z).

Optionally, the waveshaping unit further comprises a locally connected smooth adaptive activation function layer following the second deep neural network.

Optionally, the waveshaping unit further comprises a first squeeze-and-excitation layer following the locally connected smooth adaptive activation function layer.

At least one of the waveshaped frequency band decomposition (X1^, X1.2^) and the modified frequency band decomposition (X2^, X1.1^) is optionally scaled by a gain factor (se, se1, se2) before summing to produce the summation output (X0^).

Optionally, each of kernel matrix (W1) and the weight matrix (W2) comprises fewer than 128 filters, optionally fewer than 32 filters, optionally fewer than 8 filters.

Optionally, the second deep neural network comprises first to fourth dense layers optionally respectively comprising 32, 16, 16 and 32 hidden units, optionally wherein each of the first to third dense layers of the second deep neural network is followed by a tan h function.

Optionally, in the waveshaping unit, the first squeeze-and-excitation layer comprises an absolute value layer preceding a global average pooling operation.

The method may further comprise passing on the input frequency band decomposition (X1) as the residual feature map (R). The method may further comprise passing on the modified feature map as the pre-shaped frequency band decomposition. The method may further comprise passing on the modified feature map as the modified frequency band decomposition (X2^, X1.1^).

Optionally, the first deep neural network comprises a plurality of bidirectional long short-term memory layers, optionally followed by a smooth adaptive activation function layer.

Optionally, the plurality of bidirectional long short-term memory layers comprises first, second and third bidirectional long short-term memory layers, optionally comprising 64, 32 and 16 units respectively.

Optionally, the plurality of bidirectional long short-term memory layers is followed by a plurality of smooth adaptive activation function layers, each optionally being composed of 25 intervals between −1 to +1.

Optionally, the first deep neural network comprises a feedforward WaveNet comprising a plurality of layers, optionally wherein the final layer of the WaveNet is a fully-connected layer.

Optionally, the first deep neural network comprises a plurality of shared bidirectional long short-term memory layers, followed by, in parallel, first and second independent bidirectional long short-term memory layers. Optionally, the second latent representation (Z1^) is derived from the output of the first independent bidirectional long short-term memory layer. Optionally, in the waveshaping unit, the first squeeze-and-excitation layer further comprises along short-term memory layer. Optionally, the method further comprises passing on the input frequency band decomposition (X1) as the pre-shaped frequency band decomposition. The method may further comprise processing the first latent representation (Z) using the second independent bidirectional long short-term memory layer to obtain a third latent representation (Z2^). The method may further comprise processing the third latent representation (Z2^) using a sparse finite impulse response layer to obtain a fourth latent representation (Z3^). The method may further comprise convolving the frequency band representation (X1) with the fourth latent representation (Z3^) to obtain said residual feature map (X5). The method may further comprise processing the modified feature map by a second squeeze-and-excitation layer comprising along short-term memory layer to obtain said modified frequency band decomposition (X2^, X1.1^).

Optionally, the plurality of shared bidirectional long short-term memory layers comprises first and second shared bidirectional long short-term memory layers optionally comprising 64 and 32 units respectively, optionally wherein each of the first and second shared bidirectional long short-term memory layers has a tan h activation function.

Optionally, each of the first and second independent bidirectional long short-term memory layers comprises 16 units, optionally wherein each of the first and second independent bidirectional long short-term memory layers comprises a locally connected smooth adaptive activation function.

Optionally, the sparse finite impulse response layer comprises first and second independent dense layers taking the third latent representation (Z2^) as input. The sparse finite impulse response layer may further comprise a sparse tensor taking the respective output of the first and second independent dense layers as inputs, the output of the sparse tensor being the fourth latent representation (Z3^). Optionally, the first and second independent dense layers comprise respectively a tan h function and a sigmoid function.

Optionally, al the convolutions are along the time dimension and have a stride of unit value.

Optionally, at least one of the deep neural networks is trained in dependence on data representing one or more audio effect selected from a group comprising: tube amplifier, distortion, speaker-amplifier, ladder filter, power amplifier, equalisation, equalisation-and-distortion, compressor, ring modulator, phaser, modulation based on operational transconductance amplifier, flanger with bucket brigade delay, modulation based with bucket brigade delay, Leslie speaker horn, Leslie speaker horn-and-woofer, flanger-and-chorus, modulation based, modulation based-and-compressor, plate-and-spring reverberation, echo, feedback delay, slapback delay, tape-based delay, noise-driven stochastic effects, dynamic equalisation based on input signal level, audio morphing, timbre transformations, phase vocoder, time stretching, pitch shifting, time shuffling, granulation, 3D loudspeaker setup modeling, and mom acoustics.

There is disclosed a computer program comprising instructions which, when the program is executed by a computer, cause the computer to carry out the method disclosed hereinabove.

There is disclosed a computer-readable storage medium comprising the computer program above.

There is also disclosed an audio data processing device comprising a processor configured to perform the method disclosed hereinabove.

FIGURES

FIG. 1A: Block diagram of CAFx; adaptive front-end, synthesis back-end and latent-space DNN.

Figure 1B:
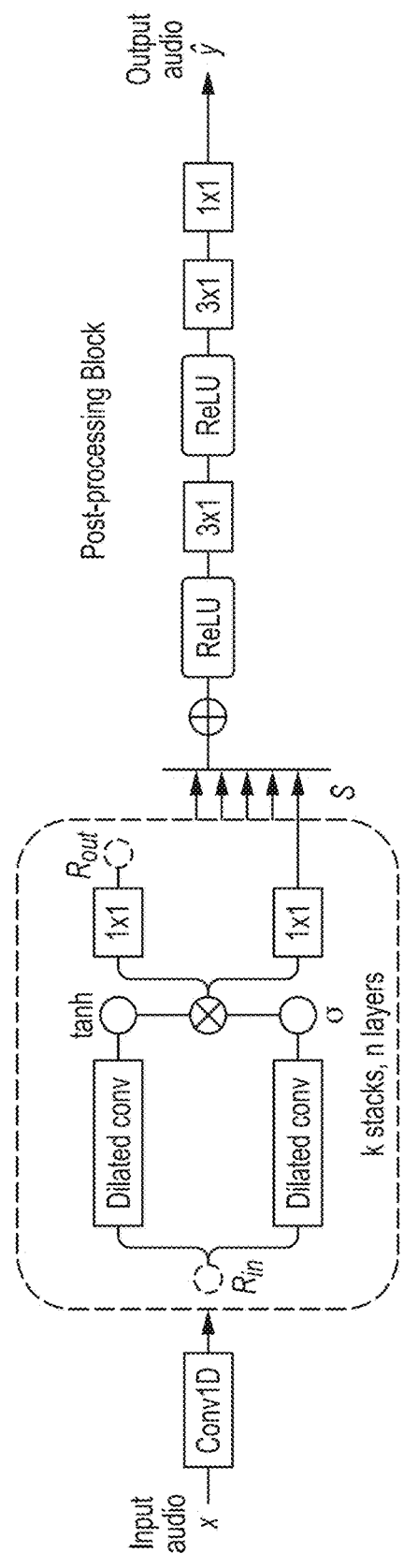

FIG. 1B: Block diagram of the feedforward WaveNet; stack of dilated convolutional layers and the post-processing block.

Figure 2A:
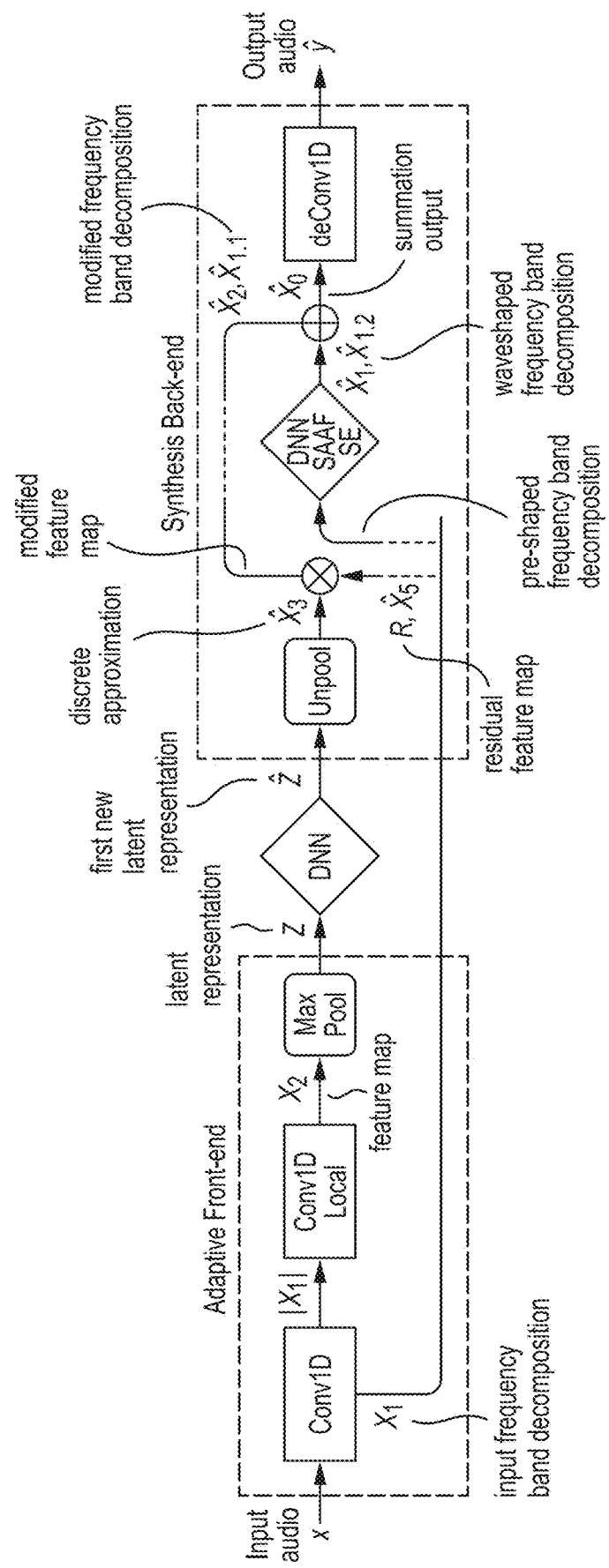

FIG. 2A: Block diagram of an audio processing architecture built on CAFx and WaveNet, capable of modeling time-varying and non-linear audio effects.

Figure 2B:
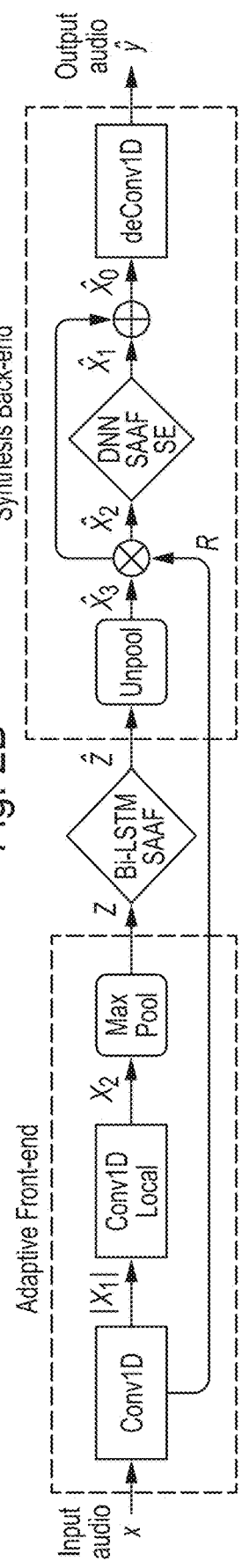

FIG. 2B: Block diagram of CRAFx; adaptive front-end. Latent-space $B_i$-LSTM and synthesis back-end.

Figure 2C:
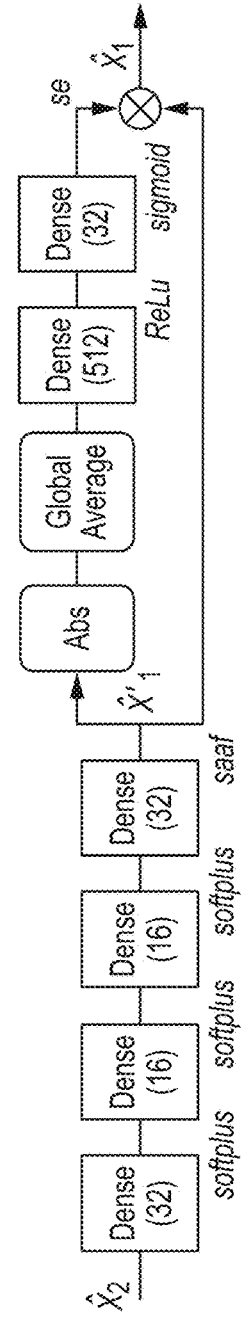

FIG. 2C: Block diagram of DNN-SAAF-SE.

Figure 2D:
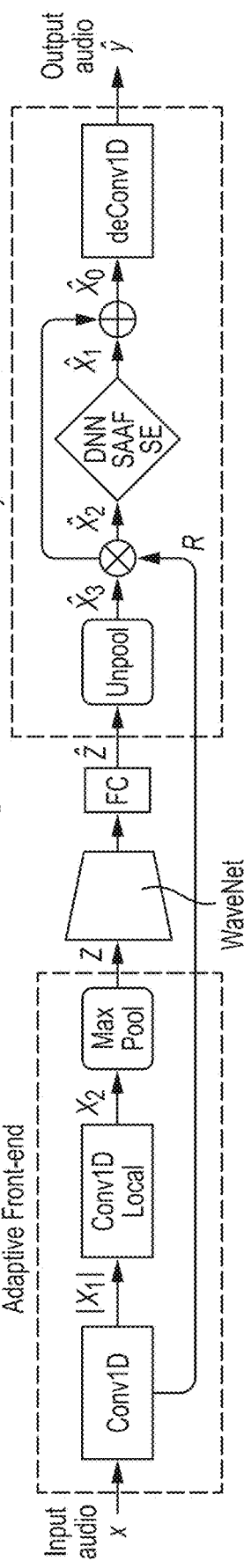

FIG. 2D: Block diagram of CWAFx; adaptive front-end, latent-space Wavenet and synthesis back end.

Figure 2E:
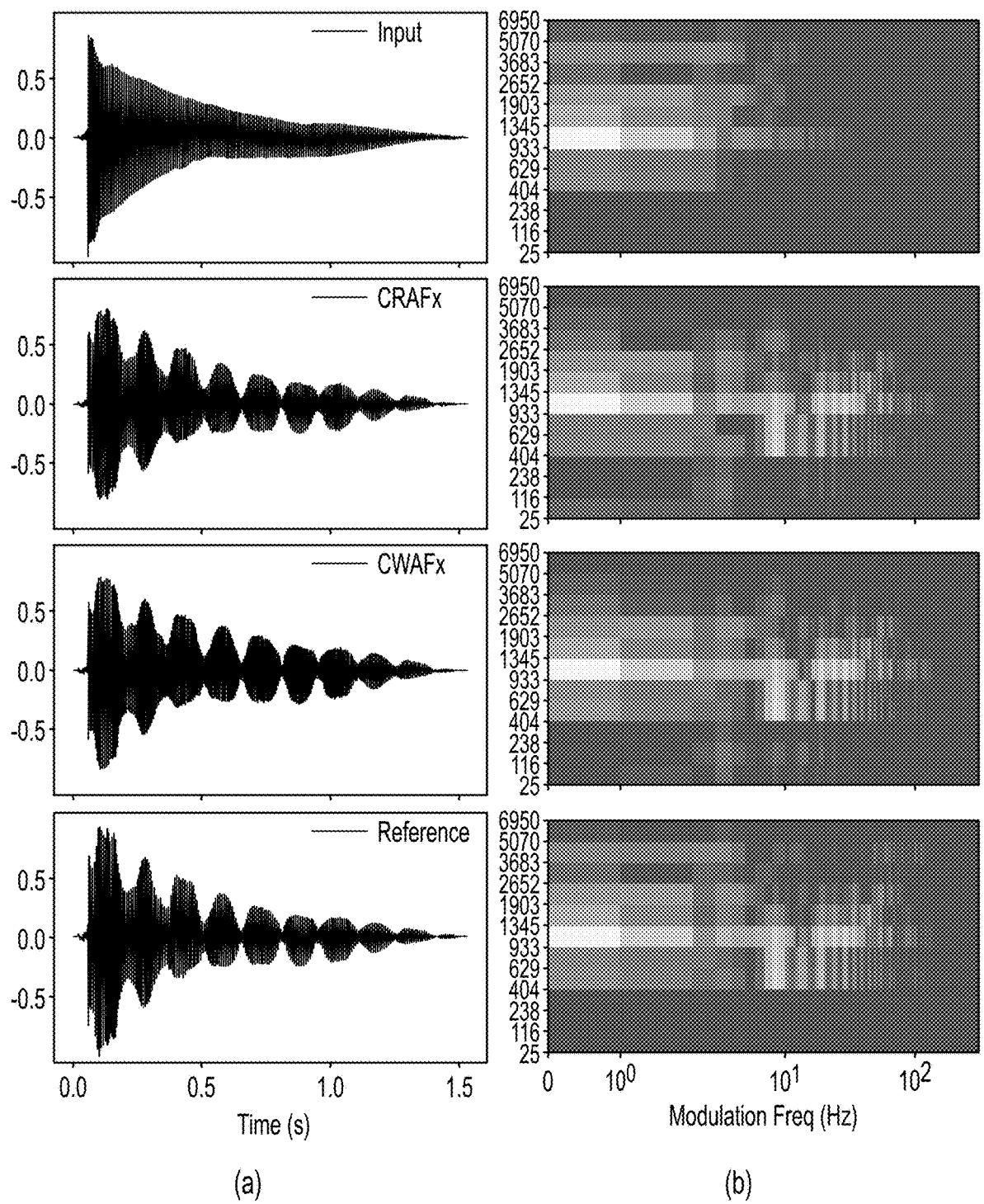

FIG. 2E: Results with selected samples from the test dataset for the Leslie speaker task (right channel). FIGS. 2E($a$) and 2E($b$) show waveforms and their respective modulation spectrum. Vertical axes represent amplitude and Gammatone center frequency (Hz) respectively.

Figure 3:
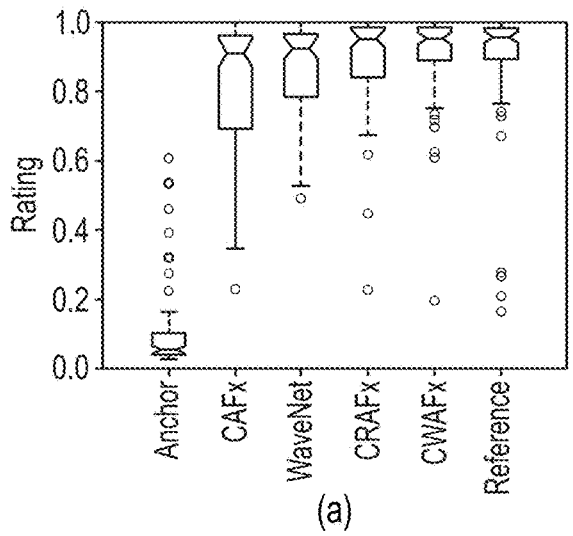
Figure 3:
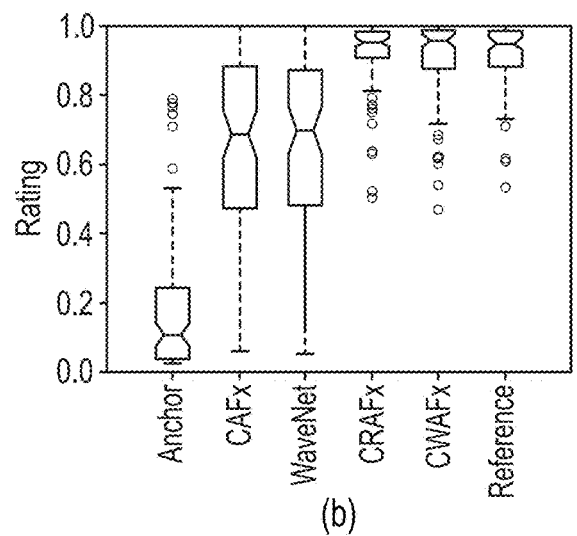
Figure 3:
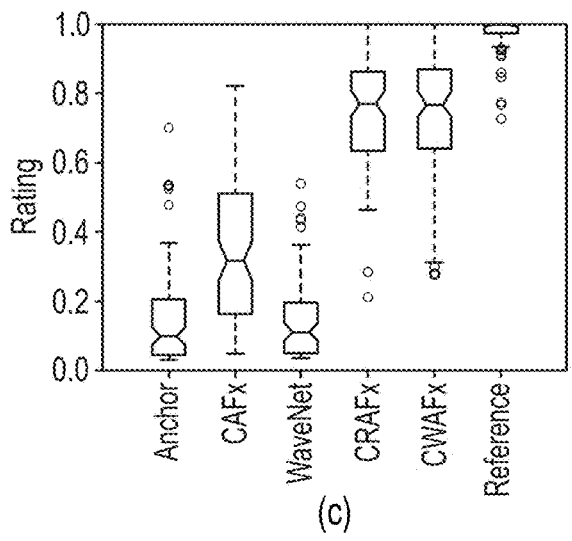
Figure 3:
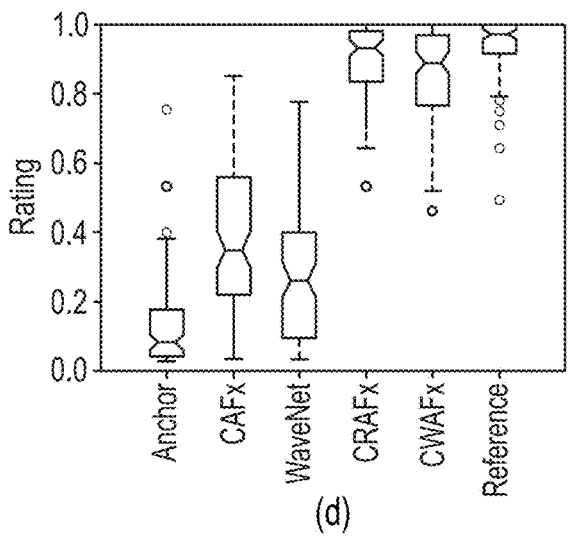
Figure 3:
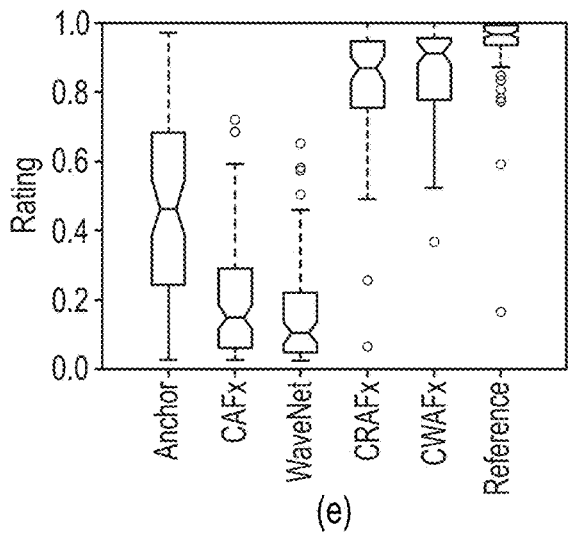
Figure 3:
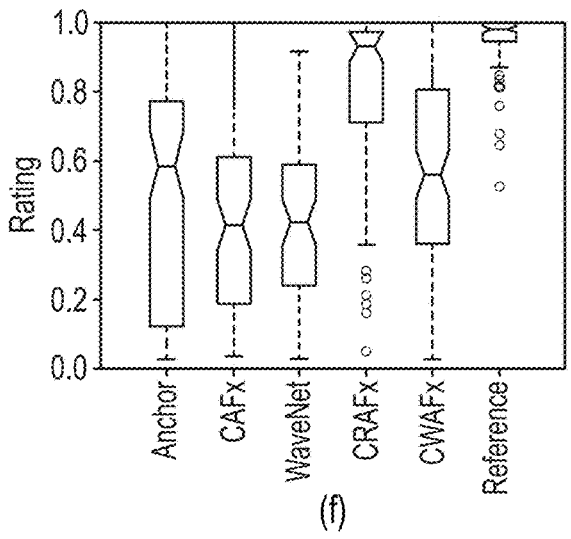

FIG. 3: Box plot showing the rating results of the listening tests. FIG. 3($a$) preamp, FIG. 3($b$) limiter, FIG. 3($c$) Lese speaker horn-tremolo, FIG. 3($d$) Leslie speaker woofer-tremolo, FIG. 3($e$) Lese speaker horn chorale and FIG. 3($f$) Lese speaker woofer-chorale.

Figure 4A:
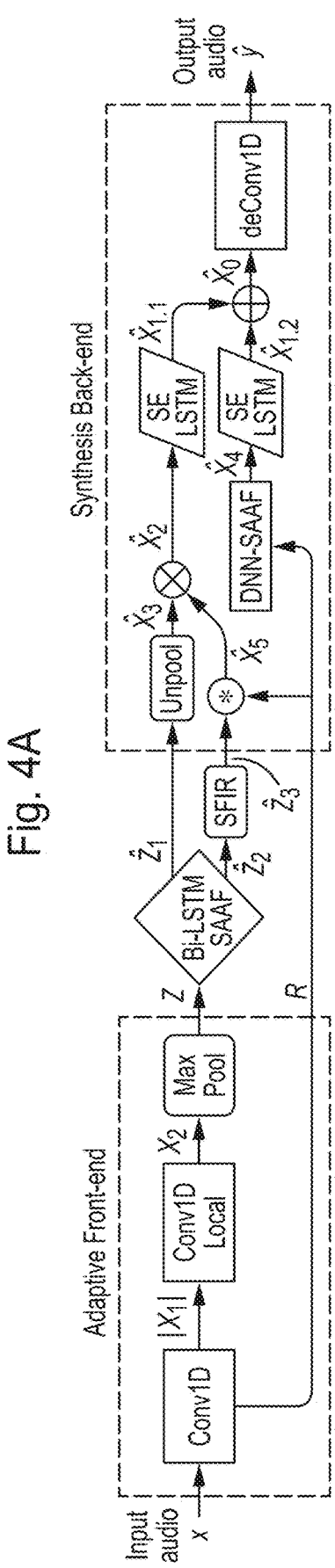

FIG. 4A: Block diagram of CSAFx; adaptive front-end, latent-space and synthesis back-end.

Figure 4B:
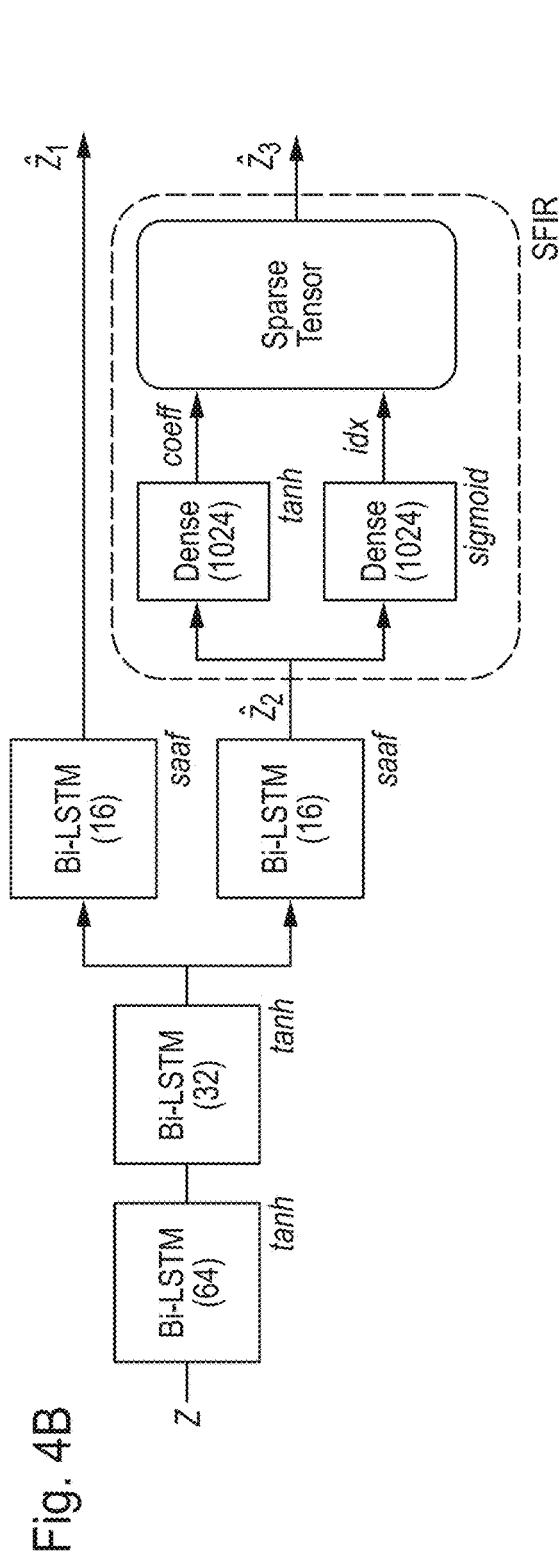

FIG. 4B: Block diagram of the latent-space of CSAFx.

Figure 4C:
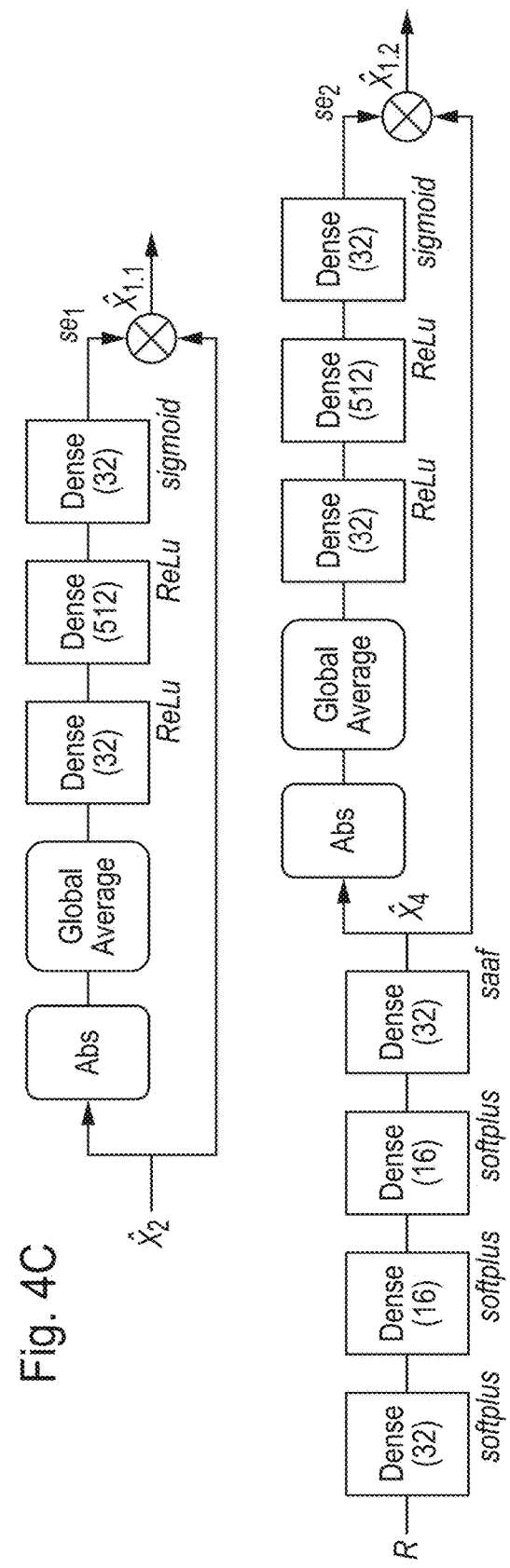

FIG. 4C: Block diagram of the synthesis back-end of CSAFx.

Figure 4D:
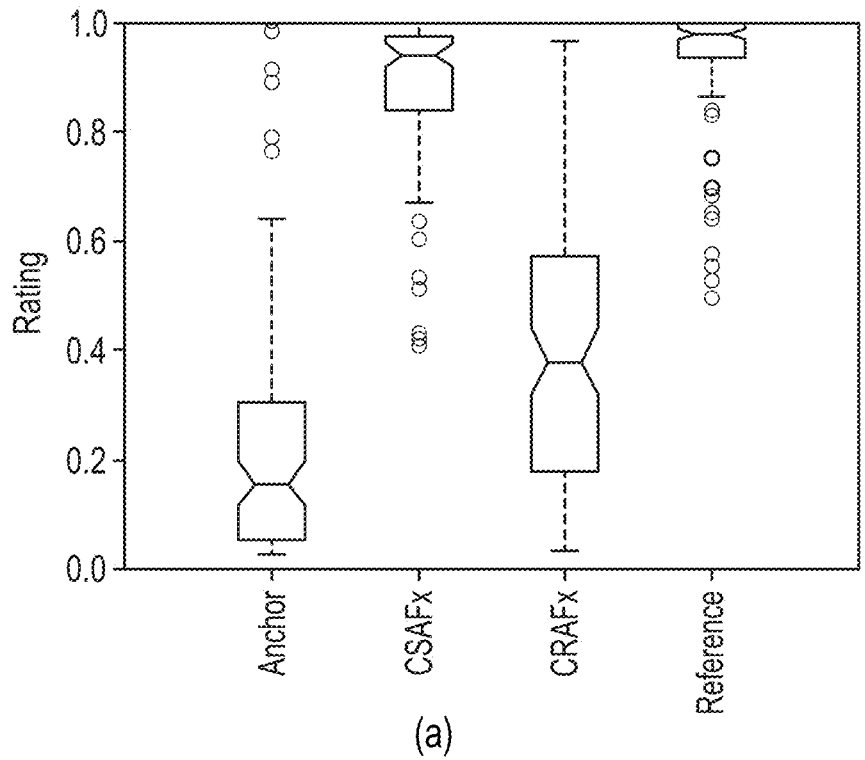
Figure 4D:
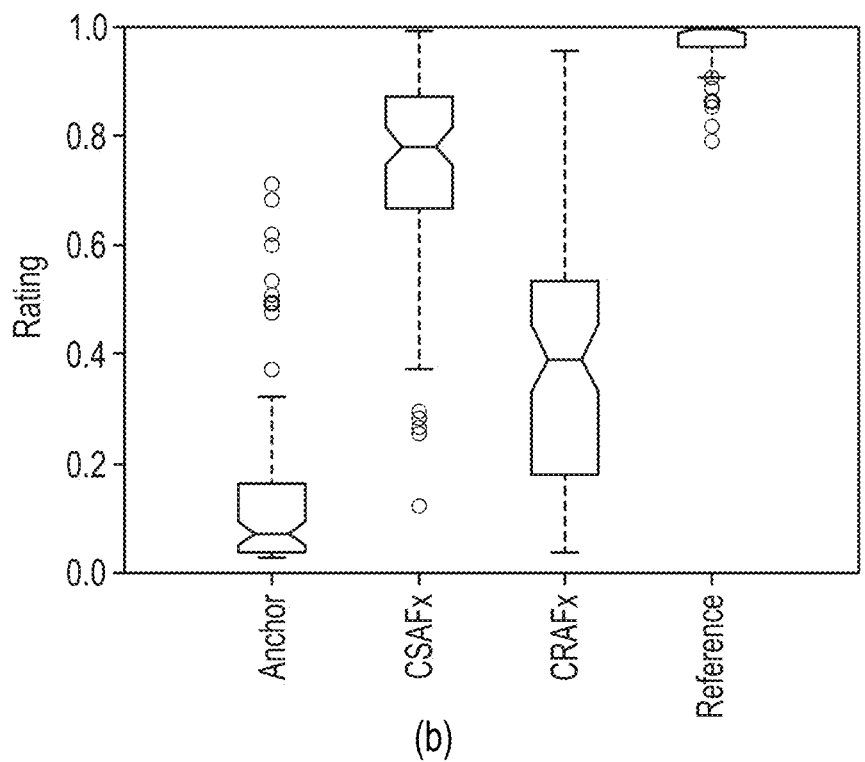

FIG. 4D: Box plot showing the rating results for the listening tests. From top to bottom: plate and spring reverb tasks.

DETAILED DESCRIPTION

Embodiments provide improved techniques for modeling audio effects.

In recent years, deep neural networks (DNN) for music have experienced a significant growth. Most music applications are in the fields of music information retrieval, music recommendation, and music generation. End-to-end deep learning architectures, where raw audio is both the input and the output of the system, follow black-box modeling approaches where an entire problem can be taken as a single indivisible task which must be earned from input to output. Thus, the desired output is obtained by earning and processing directly the incoming raw audio, which reduces the amount of required prior knowledge and minimizes the engineering effort.

Prior to the present invention, deep earning architectures using this principle, i.e. processing directly raw audio, had not been explored for audio processing tasks such as audio effects modeling.

Nevertheless, DNNs for audio effects modeling have recently become an emerging field and have been investigated as end-to-end methods or as parameter estimators of audio processors. Most of the end-to-end research has focused on modeling nonlinear audio processors with short-term memory, such as distortion effects. Moreover, the methods based on parameter estimation are based on fixed audio processing architectures. As a result, generalization among different types of audio effect units is usually difficult. This lack of generalization is accentuated when we take into account the broad characteristic of the different types of audio effects, some of which are based on highly complex nonlinear and time-varying systems whose modeling methods remain an active field.

There is disclosed a general-purpose deep earning architecture for audio processing in the context of audio effects modeling. Thus, our motivation is to demonstrate the feasibility of DNNs as audio processing blocks for generic blackbox modeling of all types of audio effects. In this way, Oven an arbitrary audio processor, a neural network may learn and apply the intrinsic characteristics of this transformation. The architecture is capable of recreating the sound, behaviour and main perceptual features of various types of audio effects. Based on the modeling capabilities of DNNs together with domain knowledge from digital audio effects, we propose different deep earning architectures. These models can process and output audio that matches the sonic and perceptual qualities of a reference audio effect. Throughout this disclosure, we measure the performance of the models via objective perceptual-based metrics and subjective listening tests.

Publication I: "End-to-end equalization with convolutional neural networks." Martinez Ramirez, M. A.; Reiss, J. D. In Proceedings of the 21st International Conference on Digital Audio Effects (DAFx-18), Aveiro, Portugal, 4-8 Sep. 2018. http://dafx2018.web.ua.pt/papers/DAFx2018_paper_27.pdf Publication I, which is incorporated herein by reference, contains a derivation of Convoludaona EQ modeling neworck (CEQ), which is a DNN for end-to-end black-box modeling of linear audio effects.

Publication II: "Modeling nonlinear audio effects with end-to-end deep neural networks." Martinez Ramirez, M. A.; Reiss, J. D. In Proceedings of the IEEE International Conference on Acoustics, Speech, and Signal Processing (ICASSP), Brighton, UK, 12-17 May 2019. https://ieeexplore.ieee.org/document/8683529 Publication II, which is incorporated herein by reference, contains a derivation of Convolutional Audio Effects modeling network (CAFx), which is for black-box modeling of nonlinear and linear audio effects.

Embodiments are described in detail in the following chapters of the present document 1—Modeling Nonlinear Audio Effects In this chapter we build on the CEQ modeling network from Publication I in order to emulate much more complex transformations, such as distortion effects. Therefore we introduce CAFx: a novel deep learning architecture for modeling nonlinear and linear audio effects with short-term memory. In addition, we also provide a nonlinear modeling network based on a feedforward variant of the wavenet architecture.

Distortion effects are mainly used for aesthetic reasons and are usually applied to electric musical instruments. Most existing methods for nonlinear modeling are often either simplified or optimized to a very specific circuit. Thus, in this chapter we investigate general-purpose end-to-end DNNs for black-box modeling of nonlinear audio effects.

For an arbitrary combination of linear and nonlinear audio effects with short-term memory, the models learn how to process the audio directly in order to match the target audio. Given a nonlinearity, consider x and y the raw and distorted audio signals respectively. In order to obtain a $\hat{y}$ that matches the target y, we train a DNN to modify x based on the nonlinear task.

We provide nonlinear emulation as a content-based transformation without explicitly obtaining the solution of the nonlinear system. We report that CAFx, a model based on convolutional and dense layers can incorporate adaptive activation functions, such as SAAF. This in order to explicitly train SAAFs to act as waveshapers in audio processing tasks such as nonlinear modeling. Thus, since distortion effects are characterized by their waveshaping nonlinearity, we rely on the smooth attributes of SAAFs, which can approximate any continuous function, to act as trainable waveshapers within a DNN modeling framework.

In this manner, we provide the capabilities of DNNs as audio processing blocks in the context of modeling nonlinear audio effects. Through the use of specific domain knowledge, such as waveshaping nonlinearities, we increase the function approximation capabilities of DNNs when performing nonlinear audio processing tasks with short-term memory.

Through the same nonlinear modeling tasks we analyse WaveNet, a model solely based on temporal dilated convolutions. We measure the performance of the models via a perceptually-based objective metric and we report that both models perform similarly when modeling distortion, overdrive, amplifier emulation and combinations of linear and nonlinear digital audio effects.

In the following sections we present the architecture of the different modeling networks. All the models are based entirety in the time-domain and end-to-end; with raw audio as the input and processed audio as the output Code is available online (https/github.com/mchijmma/DL-AFx/tree/master/src).

1.1—Convolutional Audio Effects Modeling Network—Cafx

The model is divided into three parts: adaptive front-end, synthesis back-end and latent-space DNN. The architecture is designed to model nonlinear audio effects with short-term memory and is based on a parallel combination of cascade input filters, trainable waveshaping nonlinearities, and output filters.

All convolutions are along the time dimension and all strides are of unit value. This means, during convolution, we move the filters one sample at a time. In addition, padding is done on each side of the input feature maps so that the output maintains the resolution of the input. Dilation is not introduced.

The model is depicted in FIG. 1.1 and its structure is described in detail in Table 1.1. We use an input frame of size 1024 and sampled with a hop size of 256 samples.

The adaptive front-end and latent-space DNN are exactly the same as in CEQ (see Publication 1). The main difference is the incorporation of dense layers and SAAFs into the back-end. This in order to allow the model to learn the waveshaping nonlinearities that characterize distortion effects.

TABLE 1.1

Detailed architecture of CAFx with an input frame size of 1024 samples.

| Layer | Output shape | Weights | Output |
|---|---|---|---|
| Input | (1024, 1) | • | x |
| Conv1D | (1024, 328) | 128(64) | $X_1$ |
| Residual | (1024, 128) | • | R |
| Abs | (1024, 128) | • | • |
| Conv1D-Local | (1024, 128) | 128(128) | $X_2$ |
| MaxPooling | (64, 128) | • | Z |
| Dense-Local | (128, 64) | 64(128) | • |
| Dense | (128, 64) | 64 | $\hat{Z}$ |
| Unpooling | (1024, 128) | • | $\hat{X}_2$ |
| R × $\hat{X}_2$ | (1024, 128) | • | $\hat{X}_1$ |
| Dense | (1024, 128) | 128 | • |
| Dense | (1024, 64) | 64 | • |
| Dense | (1024, 64) | 64 | • |
| Dense | (1024, 128) | 128 | • |
| SAAF | (1024, 128) | 128(25) | $\hat{X}_0$ |
| deConv1D | (1024, 1) | • | $\hat{y}$ |

Adaptive Front-End

The adaptive front-end comprises a convolutional encoder. It contains two convolutional layers, one pooling layer and one residual connection. The front-end is considered adaptive since its convolutional layers learn a filter bank for each modeling task and directly from the audio.

The first convolutional layer is followed by the absolute value as nonlinear activation function and the second convolutional layer is locally connected (LC). This means we follow a filter bank architecture since each filter is only applied to its corresponding row in the input feature map. The later layer is followed by the softplus nonlinearity. The max-pooing layer is a moving window of size 16, where the maximum value within each window corresponds to the output and the positions of the maximum values are stored and used by the back-end. The operation performed by the first layer can be described as follows.

$$X_1 = x * W_1 \quad (1.2)$$

$$R = X_1 \quad (1.3)$$

Where W1 is the kernel matrix from the first layer, and X1 is the feature map after the input audio x is convolved with W1. The weights W1 comprise 128 one-dimensional filters of size 64. The residual connection R is equal to X1, which corresponds to the frequency band decomposition of the input x. This is due the output of each filter of Conv1D can be seen as a frequency band.

The operation performed by the second layer is described by the following equation.

$$X_2^{(i)} = f_2(|X_1^{(i)}| * W_2^{(i)}), \forall i \in [1,128] \quad (2,4)$$

Where $X2^{(i)}$ and $W2^{(i)}$ are the ith row of the feature map X2 and kernel matrix W2, respectively. Thus, X2 is obtained after the LC convolution with W2, the weight matrix of Conv1D-local, which has 128 filters of size 128. f2( ) is the softplus function.

The adaptive front-end performs time-domain convolutions with the raw audio and is designed to learn a latent representation for each audio effect modeling task. It also generates a residual connection which is used by the back-end to facilitate the synthesis of the waveform based on the specific audio effect transformation.

This differs from traditional encoding practices, where the complete input data is encoded into a latent-space, which causes each layer in the decoder to solely generate the complete desired output (He et al., 2016). Furthermore, a full encoding approach such as Engel et al. (2017); Oord et al. (2016) will require very deep models, large data sets and difficult training procedures.

By using the absolute value as activation function of the first layer and by having larger filters W2, we expect the front-end to learn smoother representations of the incoming audio, such as envelopes Venkataramani et al. (2017).

Latent-Space DNN

The latent-space DNN contains two dense layers. Following the filter bank architecture, the first layer is based on LC dense layers and the second layer comprises a FC layer. The DNN modifies the latent representation Z into a new latent representation Z^ which is fed into the synthesis back-end. The first layer applies a different dense layer to each row of the matrix Z and the second layer is applied to each row of the output matrix from the first layer. In both layers, al dense layers have 64 hidden units, are followed by the softplus function ($f_h$) and are applied to the complete latent representation rather than to the channel dimension.

The operation performed by the latent-space DNN is as follows.

$$\hat{Z}_h^{(i)} = f_h(Z^{(i)}, V_1^{(i)}), \forall i \in [1,64] \quad (1.5)$$

$$\hat{Z} = f_h(Z_h - V_2) \quad (1.6)$$

Where $Zh^{(i)}$ is the ith row of the output feature map Zh^ of the LC layers. Likewise, $V1^{(i)}$ is the ith dense layer corresponding to the weight matrix V1 of the LC layer. V2 corresponds to the weights of the FC layer.

The output of the max pooling operation Z corresponds to an optimal latent representation of the input audio Oven the EQ task, such as envelopes. The DNN is trained to modify these envelopes, thus, a new latent representation or set of envelopes Z^ is fed into the synthesis back-end in order to reconstruct an audio signal that matches the target task.

Synthesis Back-End

The synthesis back-end accomplishes the nonlinear task by the following steps. First, X2^, the discrete approximation of X2, is obtained via unpooling the modified envelopes Z^. Then the feature map X1^ is the result of the element-wise multiplication of the residual connection R and X2^. This can be seen as an input filtering operation, since a different envelope gain is applied to each of the frequency band decompositions obtained in the front-end.

The second step is to apply various waveshaping nonlinearities to X1^. This is achieved with a processing block containing dense layers and smooth adaptive activation functions (DNN-SAAF). The DNN-SAAF comprises 4 FC dense layers. All dense layers are followed by the softplus function with the exception of the last layer. Locally connected SAAFs are used as the nonlinearity for the last layer. Overall, each function is locally connected and composed of 25 intervals between −1 to +1.

We tested different standard and adaptive activation functions, such as the parametric and non parametric ReLU, hyperbolic tangent, sigmoid and fifth order polynomials. Nevertheless, we found stability problems and non optimal results when modeling nonlinear effects. Since each SAAF explicitly acts as a waveshaper, the DNN-SAAF is constrained to behave as a set of trainable waveshaping nonlinearities, which follow the filter bank architecture and are applied to the channel dimension of the modified frequency decomposition X1^.

Finally, the last layer corresponds to the deconvolution operation, which can be implemented by transposing the first layer transform. As in CEQ, this layer is not trainable since its kernels are transposed versions of W1. In this way, the back-end reconstructs the audio waveform in the same manner that the front-end decomposed it. The complete waveform is synthesized using a hann window and constant overlap-add gain.

$$\hat{y} = \hat{X}_1 * W_1^T \quad (1.8)$$

1.2 Feedforward Wavenet Audio Effects Modeling Network—WaveNet

The WaveNet architecture corresponds to a feedforward variation of the original autoregressive model. For a regression task, such as nonlinear modeling, the predicted samples are not fed back into the model, but through a sliding input window, where the model predicts a set of samples in a single forward propagation. The feedforward wavenet implementation is based on the architecture proposed in Damskägg et al. (2019) and Rethage et al. (2018). The model is divided into two parts: stack of dilated convolutions and a post-processing block. The model is depicted in FIG. 1.2 and its structure is described in Table 1.2.

TABLE 1.2

Detailed architecture of WaveNet with input and output frame sizes of 1277 and 1024 samples respectively.

| Layer - Output shape - Weights | Output |
| --- | --- |
| Input (1276, 1) | x |
| Conv1D (1276, 16) - 16(3) | $R_{in}$ |
| Dilated conv (1276, 16) -     Dilated conv (1276, 16) - 16(3)     16(3) | • |
| Tanh (1276, 16)     Sigmoid (1276, 16) | • • |
| Multiply (1276, 16) | z |
| Conv1D (1276, 16) - 16(1)    Conv1D (1276, 16) - 16(1) | $R_{out}$ S |
| Add (1024, 16) | • |
| ReLU (1024, 16) | • |
| Conv1D (1024, 2048) - 2048(3) | • |
| ReLU (1024, 16) | • |
| Conv1D (1024, 256) - 256(3) | • |
| Conv1D (1024, 1) - 1(1) | $\hat{y}$ |

We use 2 stacks of 6 dilated convolutional layers with a dilation factor of 1, 2, . . . , 32 and 16 filters of size of 3. From FIG. 1.1, prior to the stack of dilated convolutions, the input x is projected into 16 channels via a 3×1 convolution. This in order to match the number of channels within the feature maps of the dilated convolutions. The stack of dilated convolutions processes the input feature map Rin with 3×1 gated convolutions and exponentially increasing dilation factors. This operation can be described by:

$$z = \tan h(W_f * R_{in}) \times \sigma(W_g * R_{in}) \quad (1.1)$$

Where Wf and Wg are the filter and gated convolutional kernels, tan h and σ the hyperbolic tangent and sigmoid functions and * and x the operators for convolution and element-wise multiplication. The residual output connection Rout and the skip connection S are obtained via a 1×1 convolution applied to z. Therefore S is sent to the post-processing block and Rout is added to the current input matrix Rin, thus, resulting in the residual input feature map of the next dilated convolutional layer.

The post-processing block consists in summing all the skip connections S followed by a ReLU. Two final 3×1 convolutions are applied to the resulting feature map, which contain 2048 and 256 filters and are separated by a ReLU. As a last step, a 1×1 convolution is introduced in order to obtain the single-channel output audio y^.

The receptive field rf of a wavenet architecture can be computed with the following equation (Oord et al., 2016).

$$rf = 1 + n(f_k - 1)\sum_{i=1}^{D} d_i \quad (1.2)$$

Where n is the number of stacks, $f_k$ is the size of the filters, D is the number of dilated layers and di corresponds to each dilation factor. For this architecture, the receptive field of the model is of 253 samples and the target field tf is 1024 samples. Therefore the input frame if presented to the model comprises siding windows of 1276 samples and is calculated as follows (Rethage et al., 2018).

$$if = rf + (tf - 1) \quad (1.3)$$

In the following chapter, we build on these architectures and we provide RNNs and latent-space temporal dilated convolutions to model transformations involving long term memory such as dynamic range compression or different modulation effects.

2—Modeling Time-Varying Audio Effects

Audio effects whose parameters are modified periodically over time are often referred as time-varying or modulation based audio effects. Furthermore, a broad family of time-invariant audio effects is based on long-term dependencies, such as compressors. By assuming linear behaviour or by omitting certain nonlinear circuit components, most of these effects can be implemented directly in the digital domain through the use of digital filters and delay lines.

Nevertheless, modeling of this type of effects remain an active field, since musicians tend to prefer analog counterparts and current methods are often optimized to a very specific circuit. Therefore such models are not easily transferable to different effects units since expert knowledge of the type of circuit being modeled is always required and cannot be efficiently generalized to other time-varying or time-invariant audio effects with long-term memory.

Since the architectures from previous chapters do not generalize to transformations with long temporal dependencies, in this chapter we provide the capabilities of end-to-end DNNs to learn the long-term memory which characterizes these effect units. We build on the CAFx and WaveNet architectures and we propose two novel general-purpose modeling networks: CRAFx and CWAFx. Based on the adaptive front-end and back-end structures from previous models, a latent-space based on Bidirectional Long Short-Term Memory (Bi-LSTM) layers or temporal dilated convolutions is able to learn time-varying transformations. Code is available online: https://github.com/mchijmma/DL-AFx/tree/master/src and the number of parameters and computational complexity are shown in Appendix A.

Therefore we introduce deep learning architectures for generic black-box modeling of audio processors with long-term memory. We show the models matching digital implementations of modulation based audio effects such as chorus, flanger, phaser, tremolo, vibrato, LFO-based auto-wah, ring modulator and Leslie speaker. Furthermore, we extend the applications of the model by including nonlinear time-invariant audio effects with long temporal dependencies such as auto-wah with envelope follower, compressor and multiband compressor. We also introduce nonlinearities such as overdrive into linear time-varying effect units, in order to test the capabilities of the networks when modeling nonlinear time-varying audio trans-formations.

We provide linear and nonlinear time-varying emulation as a content-based transformation without explicitly obtaining the solution of the time-varying system. In order to measure the performance of the model, we propose an objective metric based on the psychoacoustics of modulation frequency perception. We also analyze what the model is actually leaning and how the Oven task is accomplished.

With reference to FIG. 2.0, the overall structure is based on three parts: adaptive front-end, latent-space DNN and synthesis back-end.

First, the input audio x is transformed into a feature map X2 which is subsampled into the latent representation Z. This may be done via two successive convolutions, for example via the filter bank architecture of convolution kernels W1 and W2.

Also, through the first convolution, a frequency band decomposition X1 is obtained, from which a residual feature map R may be derived. The residual feature map R may be additionally derived from further input.

The latent representation Z is modified into new latent representations $\hat{Z}$, $\hat{Z}1$ . . . . This may be done via a DNN.

The new latent representation is upsampled into the feature map $X3^\wedge$, such as via unpooling or upsampling operations.

$X3^\wedge$ may be used to modify the residual feature map R (or a pre-modified version $X5^\wedge$), such as by element-wise multiplying $X3^\wedge$ with R, thus obtaining the feature map $X2^\wedge$, $X^\wedge1.1$ which corresponds to an audio stream with time-varying effects.

R, $X5^\wedge$ is further modified via a waveshaping DNN, thus obtaining the feature map $X1^\wedge$, $X1.2^\wedge$, which corresponds to an audio stream with short-term memory transformations, i.e. waveshapers.

$X2^\wedge$, $X^\wedge1.1$ and $X1^\wedge$, $X1.2^\wedge$ are summed into the frequency band decomposition $X0^\wedge$, from which the target audio $\hat{y}$ is reconstructed. The reconstruction may be done via deconvolution. Optionally, the deconvolution can be implemented with the transposed kernel of W1 (W1T).

This summation allows an audio stream with time-varying effects (i.e. modulation-based or envelope-based with long-term memory) to be mixed with an audio stream without time-varying effects (i.e. the input audio stream with or without waveshaping transformations).

2.1 Convolutional Recurrent Audio Effects Modeling Network—CRAFx

The CRAFx model builds on the CAFX architecture and is also divided into three parts: adaptive front-end, latent-space and synthesis back-end. A block diagram can be seen in FIG. 2.1 and its structure is described in detail in Table 2.1. The main difference is the incorporation of Bi-LSTMs into the latent-space and the modification of the synthesis back-end structure. This in order to allow the model to learn nonlinear transformations with long temporal dependencies. Also, instead of 128 channels, due to the training time of the recurrent layers, this model uses a filter bank structure of 32 channels or filters.

In order to allow the model to learn long-term memory dependencies, the input comprises the audio frame x at the current time step t, concatenated with the k previous and k subsequent frames. These frames are of size N and sampled with a hop size τ. The concatenated input x is described as follows.

$$x^{(j)} = x(t+j\tau), j=-k, \ldots, k \quad (2.1)$$

The adaptive front-end is exactly the same as the one from CAFx, but its layers are time distributed, i.e. the same convolution or pooling operation is applied to each of the 2k+1 input frames. The max-pooling operation is a moving window of size N/64. In this model, R is the corresponding row in X1 for the frequency band decomposition of the current input frame $x^{(0)}$. Thus, the back-end does not directly receive information from the past and subsequent context frames.

TABLE 2.1

Detailed architecture of CRAFx with input frame size of 4096 samples and ±4 context frames.

| Layer | Output shape | Weights | Output |
|---|---|---|---|
| Input | (9, 4096, 1) | • | x |
| Conv1D | (9, 4096, 32) | 32(64) | $X_1$ |
| Residual | (4096, 32) | • | R |
| Abs | (9, 4096, 32) | • | • |
| Conv1D-Local | (9, 4096, 32) | 32(128) | $X_2$ |
| MaxPooling | (9, 64, 32) | • | Z |
| Bi-LSTM | (64, 128) | 2(64) | • |
| Bi-LSTM | (64, 64) | 2(32) | • |
| Bi-LSTM | (64, 32) | 2(16) | • |
| SAAF | (64, 32) | 32(25) | $\hat{Z}$ |
| Unpooling | (4096, 32) | • | $\hat{X}_3$ |
| Multiply | (4096, 32) | • | $\hat{X}_2$ |
| Dense | (4096, 32) | 32 | • |
| Dense | (4096, 16) | 16 | • |
| Dense | (4096, 16) | 16 | • |
| Dense | (4096, 32) | 32 | • |
| SAAF | (4096, 32) | 32(25) | $\hat{X}'_1$ |
| Abs | (4096, 32) | • | • |
| Global Average | (1, 32) | • | • |
| Dense | (1, 512) | 512 | • |
| Dense | (1, 32) | 32 | se |
| $\hat{X}'_1 \times se$ | (4096, 32) | • | $\hat{X}_1$ |
| $\hat{X}_1 + \hat{X}_2$ | (4096, 32) | • | $\hat{X}_0$ |
| deConv1D | (4096, 1) | • | $\hat{y}$ |

Latent-Space Bi-LSTM

The latent-space comprises three Bi-LSTM layers of 64, 32, and 16 units respectively. The Bi-LSTMs process the latent-space representation Z, which is learned by the front-end and contains information regarding the 2k+1 input frames. These recurrent layers are trained to reduce the dimension of Z, while also learning a set of nonlinear modulators Z This new latent representation or modulators is fed into the synthesis back-end in order to reconstruct an audio signal that matches the time-varying modeling task. Each Bi-LSTM has dropout and recurrent dropout rates of 0.1 and the first two layers have tan h as activation function. Also, the nonlinearities of the last recurrent layer are locally connected SAAFs.

As shown in Section 1.1, locally connected SAAFs are used as the nonlinearity for the last layer. This in order to make use of the smooth characteristics of SAAFs, which can approximate any continuous function such as the modulators of the respective time-varying effect units. Each SAAF is composed of 25 intervals between −1 to +1.

Synthesis Back-End

The synthesis back-end accomplishes the reconstruction of the target audio by processing the frequency band decomposition R and the nonlinear modulators $\hat{Z}$. Similarity to CAFx, The back-end comprises an unpooling layer, a DNN-SAAF block and a final convolutional layer. The DNN-SAAF block comprises four dense layers of 32, 16, 16 and 32 hidden units respectively. Each dens layer is followed by the tan h function except for the last one, which is followed by a SAAF layer. The new structure of the back-end of CRAFx incorporates a Squeeze-and-Excitation (SE) (Hu et al., 2018) layer after the DNN-SAAF block (DNN-SAAF-SE).

The SE block explicitly models interdependencies between channels by adaptively scaling the channel-wise information of feature maps (Hu et al., 2018). Thus, we propose a SE block which applies a dynamic gain to each of the feature map channels of X1^', the output of DNN-SAAF. Based on the structure from Kim et al. (2018), SE comprises a global average pooling operation followed by two FC layers. The FC layers are followed by ReLU and sigmoid activation functions accordingly.

Since the feature maps within the back-end are based on time-domain waveforms, we incorporate an absolute value layer before the global average pooling operation. FIG. 2.2 depicts the block diagram of DNN-SAAF-SE, which input and output are the feature maps X2^ and X1^, respectively.

Following the filter bank architecture, the back-end matches the time-varying task by the following steps. First, an upsampling operation is applied to the earned modulators Z^ which is followed by an element-wise multiplication with the residual connection R. This can be seen as a frequency dependent amplitude modulation to each of the channels or frequency bands of R.

$$\hat{X}_2 = \hat{X}_3 \times R \quad (2.2)$$

This is followed by the nonlinear waveshaping and channel-wise scaled filters from the DNN-SAAF-SE block. Thus, the modulated frequency band decomposition X2^ is processed by the learned waveshapers from the DNN-SAAF layers, resulting in the feature map X1^'. This is further scaled by se, the frequency dependent gains from the SE layer. The resulting feature map X1^ can be seen as modeling the nonlinear short-term memory transformations within the audio effects modeling tasks.

$$\hat{X}_1 = \hat{X}'_1 \times se \quad (2.3)$$

Then, X1^ is added back to X2^, acting as a nonlinear feedforward delay line.

$$\hat{X}_0 = \hat{X}_1 + \hat{X}_2 \quad (2.4)$$

Therefore the structure of the back-end is informed by the general architecture in which the modulation based effects are implemented in the digital domain, through the use of LFOs, digital filters and delay lines.

Finally, the complete waveform is synthesized in the same way as in CAFx, where the last layer corresponds to the transposed and non-trainable deconvolution operation. As mentioned in Section 2.1, we use strides of unit value, no dilation is incorporated and we follow the same padding as in CAFx.

2.2 Convolutional and Wavenet Audio Effects Modeling Network—CWAFx

We propose a new model based on the combination of the convolutional and dense architectures from CRAFx with the dilated convolutions from WaveNet. Since the Bi-LSTM layers in the former were in charge of earning long temporal dependencies from the input and context audio frames, we replace these recurrent layers with a feedforward Wavenet. As it has been shown that dilated convolutions outperform recurrent approaches when earning sequential problems (Bal et al., 2018), such as in MatthewDavies and Böck (2019), where Bi-LSTMs are successfully replaced with this type of temporal convolutions.

Thus, it is found that a latent-space based on stacked dilated convolutions can learn frequency-dependent amplitude modulation signals. The model is depicted in FIG. 2.3. The adaptive front-end and synthesis back-end are the same as the ones presented in CRAFx.

Latent-Space Wavenet

The structure of the latent-space Wavenet is described in detail in Table 22.

With CWAFx with input frame size of 4096 samples and ±4 context frames, the latent representation Z from the front-end corresponds to 9 rows of 64 samples and 32 channels, which can be unrolled into a feature map of 576 samples and 32 channels. Thus, we approximate these input dimensions with a latent-space Wavenet with receptive and target fields of 510 and 64 samples respectively. Thus, based on Eq. (1.2), we use 2 stacks of 7 dilated convolutional layers with a dilation factor of 1, 2, . . . 64 and 32 filters of size 3. Also, we achieved better fitting by keeping the dimensions of the skip connections S and by replacing the final 1×1 convolution with a FC layer. The latter has 64 hidden units followed by the tan h activation function and is applied along the latent dimension.

TABLE 2.2

Detailed architecture of the latent-space Wavenet. This for a CWAFx with input frame size of 4096 samples and ±4 context frames.

| Layer - Output shape - Weights | Output |
|---|---|
| Z (576, 32) | • |
| Conv1D (576, 32) - 32(3) | $R_{in}$ |
| Dilated conv (576, 32) - 32(3)    Dilated conv (576, 32) - 32(3) | • |
| Tanh (576, 32)                    Sigmoid (576, 32) | • • |
| Multiply (576, 32) | • |
| Conv1D (576, 32) - 32(1)        Conv1D (576, 32) - 32(1) | $R_{out}$ S |
| Add (576, 32) | • |
| ReLU (576, 32) | • |
| Conv1D (576, 32) - 32(3) | • |
| ReLU (576, 32) | • |
| Conv1D (576, 32) - 32(3) | • |
| Dense (32, 64) - 64 | $\hat{Z}$ |

2.3 Experiments 2.3.1 Training

Likewise, the training of CRAFx and CWAFx includes the same initialization step as CEQ and CAFx. Once the convolutional layers of the front-end and back-end are pretrained, the DNN-SAAF-SE block and the latent-space Bi-LSTMs and Wavenet layers are incorporated into the respective models, and all the weights are trained following an end-to-end supervised learning task.

The loss function to be minimized is the mean absolute error between the target and output waveforms. We provide input size frames from 1024 to 8192 samples and we always use a rectangular window with a hop size of 50%. The batch size consisted of the total number of frames per audio sample.

Adam (Kingma and Ba, 2015) is used as optimizer and we perform the pre-training for 200 epochs and the supervised training for 500 epochs. In order to speed convergence, during the second training step we start with a learning rate of 5-10-5 and we reduce it by 50% every 150 epochs. We select the model with the lowest error for the validation subset.

2.3.2 Dataset

Modulation based audio effects such as chorus, flanger, phaser, tremolo and vibrato were obtained from the IDMT-SMT-Audio-Effects dataset (Stein et al., 2010). The recordings correspond to individual 2-second notes which include electric guitar and bass guitar raw notes and their respective effected versions. These effects correspond to digital implementations of effect units, such as VST audio plug-ins. For our experiments, for each of the above effects, we only use the setting #2 from where we obtained the unprocessed and processed audio for bass guitar. In addition, processing the bass guitar raw audio, we implemented an LFO-based auto-wah with a peak filter whose center frequency ranges from 500 Hz to 3 kHz and modulated by a 5 Hz sinusoidal.

Since the previous audio effects are linear time-varying, we further test the capabilities of the model by adding a nonlinearity to each of these effects. Thus, using the bass guitar wet audio, we use SoX to apply an overdrive (gain=+ 10 dB) after each modulation based effect.

We also use virtual analog implementations of a ring modulator and a Lesle speaker to process the electric guitar raw audio. The ring modulator implementation is based on Parker (2011b) and we use a modulator signal of 5 Hz. The Leslie speaker implementation is based on Smith et al. (2002) and we model each of the stereo channels.

Finally, we also provide the capabilities of the model with nonlinear time-invariant audio effects with long temporal dependencies, such as compressors and auto-wah based on an envelope follower. We use the compressor and multiband compressor from SoX to process the electric guitar raw audio.

Similarly, we use an auto-wah implementation with an envelope follower and a peak filter which center frequency modulates between 500 Hz to 3 kHz.

For each time-varying task we use 624 raw and effected notes and both the test and validation samples correspond to 5% of this subset each. The recordings were downsampled to 16 kHz and amplitude normalization was applied with exception to the time-invariant audio effects. Table 4.3 shows the details of the settings for each audio effect.

(Sukittanon et al., 2004). The modulation spectrum mean squared error (ms_mse) is based on the audio features from Mc-Dermott and Simoncelli (2011) and McKinney and Breebaart (2003) and is defined as follows:

A Gammatone filter bank is applied to the target and output entire waveforms. In total we use 12 filters, with center frequencies spaced logarithmically from 26 Hz to 6950 Hz.

The envelope of each filter output is calculated via the magnitude of the Hilbert transform (Hahn, 1996) and downsampled to 400 Hz.

A Modulation filter bank is applied to each envelope. In total we use 12 filters, with center frequencies spaced logarithmically from 0.5 Hz to 100 Hz.

The FFT is calculated for each modulation filter output of each Gammatone filter. The energy is summed across the Gammatone and Modulation filter banks and the ms_mse metric is the mean squared error of the logarithmic values of the FFT frequency bins.

The evaluation for the nonlinear time-invariant tasks (compressor and multiband compressor) corresponds to mfcc_cosine: the mean cosine distance of the MFCCs (see Section 1.3.3).

TABLE 2.3

Settings for each audio effect modeling task.

| Fx | settings |
|---|---|
| chorus | Heavy Chorus: 'Delay Time - 12 ms', 'Rate - 0.501 Hz', 'Spread - Off', 'Depth - 70%', 'Mix - 1:1', 'Level - 0 dB' |
| flanger | Standard Flange: 'Time - 3.98 ms', 'Rate - 1.2 Hz', 'Sync - Off', 'Depth - 50%', 'Spread - Off', 'Feedback - 70%', 'Mix - 1:1', 'Level - 0 dB' |
| phaser | Metallic Space: 'Stages - 6', 'Upper - 1933 Hz', 'Rate - 0.24 Hz', 'Sync - Off', 'Depth - 100%', 'Spread - Off', 'Feedback - 0%', 'Mix - 1:1', 'Level - 0 dB' |
| tremolo | Slow Pulsing: 'Frequency - 2 Hz', 'Oscillator - Sine', 'Output - 100%', 'Level - 100%' |
| vibrato | Slow Expressive Vibrato: 'Delay Time - 6 ms', 'Dry Mix - 0%', 'Wet Mix - 100%', 'Feedback - 0%', 'Modulation Rate - 2 Hz', 'Modulation Depth - 1.1 ms' |
| auto-wah | Peak filter: 'Oscillator - Sine', 'Modulation Rate - 5 Hz', 'Filter - IIR 2nd order', 'Q - 1', 'Peak Height - 0.8', 'Upper - 3000 Hz', 'Lower - 500 Hz' |
| auto-wah envelope follower | Peak filter: 'Moving Average Width - 2000', 'Filter - IIR 2nd order', 'Q - 1', 'Peak Height - 0.8', 'Upper - 3000 Hz', 'Lower - 500 Hz' |
| ring modulator | Diode-based: 'Diode Constants - 0.2, 0.4', 'Gain Modulator - 0.5', 'Oscillator - Sine', 'Modulation Rate - 5 Hz' |
| leslie speaker | Doppler Simulation and the Leslie: 'Speed Source Listener - 3.33 ms', 'Gain Output - 0.35', 'Reverb Amount - 0.025', 'Horn Angular Velocity - 1.0', 'Baffle Angular Velocity - 1.0', 'Horn Angle - 0.0', 'Baffle Angle - 0.0', 'Horn Radius - 0.18', 'Baffle Radius - 0.19050', 'Cabinet Length - 0.71', 'Cabinet Width - 0.52' |
| compressor | SoX: 'Attack Time - 10 ms', 'Release Time - 100 ms', 'Knee - 1 dB', 'Ratio - 4:1', 'Threshold - −40 dB' |
| multiband compressor | SoX: 'Frequency bands - 2', 'Crossover Frequency - 500 Hz', 'Attack Time 1 - 5 ms', 'Release Time 1 - 100 ms', 'Knee 1 - 0 dB', 'Ratio 1 - 3:1', 'Threshold 1 - −30 dB', 'Attack Time 2 - 625 μs', 'Release Time 2 - 12.5 ms', 'Knee 2 - 6 dB', 'Ratio 2 - 6:1', 'Threshold 2 - −60 dB' |

2.3.3 Evaluation

Three metrics are used when testing the models with the various modeling tasks. As shown in Chapter 1, we use the energy-normalized mean absolute error (mae). As an objective evaluation for the time-varying tasks, we propose an objective metric which mimics human perception of amplitude and frequency modulation. The modulation spectrum uses time-frequency theory integrated with the psychoacoustics of modulation frequency perception, thus, providing long-term knowledge of temporal fluctuation patterns

2.4 Results & Analysis

The capabilities of Bi-LSTMs to learn long-term temporal dependencies are explained below. For CRAFx, we use an input size of 4096 samples and k=4 for the number of past and subsequent frames.

The training procedures were performed for each type of time-varying and time-invariant audio effect. Then, the models were tested with samples from the test dataset. Audio examples for CRAFx are available online: https://mchijm-ma.github.io/modeling-time-varying/. To provide a reference, the mean mae and ms_mse and values between input and target waveforms are 0.13, 0.83 respectively. For the compressor and multiband compressor, the mean mfcc_cosine value is 0.15.

FIG. 2.4 shows the input, target, and output waveforms together with their respective modulation spectrum for modeling the Lesle speaker. In the time-domain, it is evident that the models are matching the target waveform in a like manner. From the modulation spectrum it is noticeable that the models equally introduce different modulation energies into the output which were not present in the input and which closely match those of the respective targets.

As found by the inventors, other complicated time-varying tasks, such as the ring modulator virtual analog implementations were also successfully modeled. This represents a significant result, since these implementations include emulation of the modulation introduced by nonlinear circuitry; as in the case of the ring modulator, or varying delay lines together with artificial reverberation and Doppler effect simulation; as in the Leslie speaker implementation.

The models are also able to perform linear and nonlinear time-invariant modeling. The long temporal dependencies of an envelope driven auto-wah, compressor and multiband compressor are successfully modeled.

Overall, the models performed better when modeling effect units based on amplitude modulation, such as tremolo or ring modulator, and time-varying filters, such as phaser. Delay-line effects based on frequency modulation are satisfactorily modeled as in the case of flanger or the Leslie speaker stereo channels. Nevertheless, vibrato and vibrato-overdrive represent the modeling tasks with highest errors. This might be because vibrato is an effect based solely on frequency modulation whose rate is around 2 Hz. Since this represents a modulation rate higher than the rotation horn of the Lesle speaker, this indicates that the performance of the models decreases when matching effects based on low-frequency modulation such as the slow rotating setting of the Leslie speaker (see Chapter 3). This could be improved by increasing the frequency resolution by introducing more filters or channels, e.g. a filter bank architecture of 128 filters, or by increasing the size of the latent-space through smaller max pooling.

2.5 Conclusion

In this chapter, we introduced CRAFx and CWAFx, two general-purpose deep learning architectures for modeling audio effects with long temporal dependencies. Through these two architectures, we provided the capabilities of end-to-end DNNs with Bi-LSTM layers and temporal dilated convolutions to learn long temporal dependencies such as low-frequency modulations and to process the audio accordingly. We can conclude that both models achieved similar performance and were able to successfully match digital implementations of linear and nonlinear time-varying audio effects, time-varying and time-invariant audio effects with long-term memory.

Based on mae, CRAFx accomplished a closer match of the target waveforms. Nevertheless, both models performed equally well when tested with perceptual-based metrics such as mfcc_cosine and ms_mse. It is worth to mention that the computational processing times on GPU are significant lower for CWAFx (see Appendix A). This is due to GPU-accelerated libraries such as cuDNN (Chetlur et al., 2014), which are highly optimized for convolutional layers.

In both architectures, we incorporated SE layers in order to learn and apply a dynamic gain to each of the feature map channels or frequency band decompositions. This allowed the models to apply the respective modulator signals to each channel and then further scale them through the SE layers. The introduction of this dynamic gain provided a better fitting when modeling the various time-varying tasks.

Other white-box or gray-box modeling methods suitable for these time-varying tasks would require expert knowledge such as specific circuit analysis and discretization techniques. Moreover, these methods cannot easily be extended to other time-varying tasks, and assumptions are often made regarding the non-linear behaviour of certain components. To the best of our knowledge, this work represents the first architectures for black-box modeling of linear and nonlinear, time-varying and time-invariant audio effects. It makes less assumptions about the audio processor target and represents an improvement of the state-of-the-art in audio effects modeling.

Using a small amount of training examples we showed the model matching chorus, flanger, phaser, tremolo, vibrato, LFO-based and envelope follower-based auto-wah, ring modulator, Leslie speaker and compressors. We proposed ms_mse, an objective perceptual metric to measure the performance of the model. The metric is based on the modulation spectrum of a Gammatone filter bank, thus measuring the human perception of amplitude and frequency modulation.

We demonstrated that the models process the input audio by applying different modulations which closely match with those of the time-varying target. Perceptually, most output waveforms are indistinguishable from their target counterparts, although there are minor discrepancies at the highest frequencies and noise level. This could be improved by using more convolution filters, as in CAFx, which means a higher resolution in the filter bank structures. Moreover, as shown in Publication I, a loss function based on time and frequency can be used to improve this frequency related issue, though listening tests may be required (see Chapter 3).

The generalization can also be studied more thoroughly, since the models learn to apply the specific transformation to the audio of a specific musical instrument, such as the electric guitar or the bass guitar. In addition, since the models strive to learn long temporal dependencies with shorter input size frames, and also needs past and subsequent frames, these architectures can be adapted to real-time implementations.

Real-time applications would benefit significantly from the implementation of RNN or temporal dilated convolutions to model transformations that involve long-term memory without resorting to large input frame sizes and the need for past and future context frames. Although the models were able to match the artificial reverberation of the Leslie speaker implementation, a thorough implementation of reverberation modeling is needed, such as plate, spring or convolution reverberation (see Chapter 4). In addition, since the models are learning a static representation of the audio effect, ways of devising a parametric model could also be provided. Finally, applications beyond virtual analog can be investigated, for example, in the field of automatic mixing the model could be trained to learn a generalization from mixing practices.

3 Virtual Analog Experiments

The previous chapters have focused on modeling several linear and nonlinear time-varying and time-invariant digital implementations of effect units. Furthermore, hitherto we have only evaluated the models with objective metrics. Thus, in this and the following chapters, we extend the evaluation of previous architectures by including perceptual listening tests and by modeling various analog audio effects. Taking into account that virtual analog modeling of audio effects comprises emulating the sound of an analog audio processor reference device. We show virtual analog models of nonlinear effects, such as the Universal Audio vacuum-tube preamplifier 610-B; nonlinear effects with long-term memory, such as the Universal Audio transistor-based limiter amplifier 1176LN; and electromechanical nonlinear time-varying processors, such as the rotating horn and rotating woofer of a 145 Leslie speaker cabinet.

Through objective perceptual-based metrics and subjective listening tests we demonstrate the performance of each of the architectures from Chapters 1 and 2: CAFx, WaveNet, CRAFx and CWAFx, when modeling these analog processors. We perform a systematic comparison between these architectures and we report that CAFx and WaveNet perform similarly when modeling nonlinear audio effects without memory and with long temporal dependencies, but fail to model time-varying tasks such as the Lesle speaker. On the other hand, and across all tasks, the models that incorporate latent-space RNNs or latent-space temporal dilated convolutions to explicitly learn long temporal dependencies, such as CRAFx and CWAFx, tend to outperform objectively and subjectively the rest of the models.

3.1 Experiments 3.1.1 Models

For the experiments of this chapter we use the CAFx, WaveNet, CRAFx and CWAFx architectures. In order to provide a fairer comparison, CAFx and WaveNet are adapted to process input frames of size 4096 and sampled with a hop size of 2048 samples. CRAFx and CWAFx are used exactly as described in Sections 2.1 and 2.2, respectively.

The main modification to CAFx is in the adaptive front-end where we increase the max-pooling layer to a moving window of size 64. The rest of the model is as depicted in Section 1.1. With regards WaveNet, we extend the model to 2 stacks of 8 dilated convolutional layers with a dilation factor of 1, 2, . . . , 128. Based on Eq. (1.2), the receptive field of this architecture is of 1021 samples. The target field is 4096 samples, thus the input frame presented to the model comprises siding windows of 5116 samples (see Eq. (1.3)). The rest of the architecture is as presented in Section 1.2.

Code is available online: https://github.com./mchijmma/DL-AFx/tree/master/src. Also, Appendix A shows the number of parameters and processing times across all models.

3.1.2 Training

As mentioned in previous chapters, the training of the CAFX, CRAFx and CWAFx architectures includes an initialization step. Once the front-end and back-end are pre-trained, the rest of the convolutional, recurrent, dense and activation layers are incorporated into the respective models, and all the weights are trained following an end-to-end supervised learning task. The WaveNet model is trained directly following this second step.

The loss function to be minimized is the mean absolute error and Adam (Kingma and Ba, 2015) is used as optimizer. For these experiments and for each model, we carried out the same supervised learning training procedure.

We use an early stopping patience of 25 epochs, i.e. training stops if there is no improvement in the validation loss. The model is fine-tuned further with the learning rate reduced by a factor of 4 and also a patience of 25 epochs.

The initial learning rate is 1e-4 and the batch size comprises the total number of frames per audio sample. On average, the total number of epochs is approximately 750. We select the model with the lowest error for the validation subset (see Section 3.1.3). For the Leslie speaker modeling tasks, the early stopping and model selection procedures were based on the training loss. This is explained in more detail in Section 3.3.

3.1.3 Dataset

Raw recordings of individual 2-second notes of various 6-string electric guitars and 4-string bass guitars are obtained from the IDMT-SMT-Audio-Effects dataset (Stein et al., 2010). We use the 1250 unprocessed recordings of electric guitar and bass to obtain the wet samples of the respective audio effects modeling tasks. The raw recordings are amplitude normalized and for each task the test and validation samples correspond to 5% of this dataset each. After the analog audio processors were sampled with the raw notes, all the recordings were downsampled to 16 kHz. The dataset is available online: https://zenodo.org/record/3562442.

Universal Audio vacuum-tube preamplifier 610-B

This microphone tube preamplifier (preamp) is sampled from a 6176 Vintage Channel Strip unit. In order to obtain an output signal with high harmonic distortion, the preamp is overdriven with the settings from Table 3.1.

Universal Audio transistor-based limiter amplifier 1176LN

Similarly, the wildly used field-effect transistor limiter 1176LN is sampled from the same 6176 Vintage Channel Strip unit. The limiter samples are recorded with the settings from Table 3.1. We use the slowest attack and release settings in order to further test the long-term memory of the models. The compression ratio value of ALL corresponds to all the ratio buttons of an original 1176 being pushed simultaneously. Thus, this setting also introduces distortion due to the variation of attack and release times.

145 Leslie Speaker Cabinet

The output samples from the rotating horn and woofer of a 145 Leslie speaker cabinet are recorded with a AKG-C451-B microphone. Each recording is done in mono by placing the condenser microphone perpendicularly to the horn or woofer and 1 meter away. Two speeds are recorded for each rotating speaker; tremolo for a fast rotation and chorale for a slow rotation. The rotation frequency of the horn is approximately 7 Hz and 0.8 Hz for the tremolo and chorale settings respectively, while the woofer has slower speed rotations (Herrera et al. (2009)).

Since the horn and woofer speakers are preceded by a 800 Hz crossover filter, we apply a highpass FIR filter with the same cutoff frequency to the raw notes of the electric guitar and use only these samples as input for the horn speaker. Likewise, for the woofer speaker we use a lowpass FIR filter to preprocess the raw bass notes. The audio output of both speakers is filtered with the respective FIR filters. This in order to reduce mechanical and electrical noise and also to focus the modeling tasks on the amplitude and frequency modulations. Also, the recordings are amplitude normalized.

TABLE 3.1

Settings for each analog audio effect modeling task.

| Fx | settings |
|---|---|
| preamp | 'Gain - +10 dB', 'Level - 6', 'Impedance - Line', 'High Boost/Cut - 0 dB', 'Low Boost/Cut - 0 dB' |
| limiter | 'Attack Time - 800 µs', 'Release Time - 1100 ms', 'Input Level - 4', 'Output Level - 7', 'Ratio - ALL' |
| Leslie speaker | Tremolo: 'Rotation Speed - Fast' - Chorale: 'Rotation Speed - Slow' |

3.1.4 Objective Metrics

Three metrics are used when testing the models with the various modeling tasks; me, the energy-normalized mean absolute error; mfcc_cosine, the mean cosine distance of the MFCCs (see Section 1.3.3); and ms_mse, the modulation spectrum mean squared error (see Section 2.3.3).

3.1.5 Listening Test

Thirty participants between the ages of 23 and 46 took part in the experiment which was conducted at a professional listening room at Queen Mary University of London. The Queen Mary Ethics of Research Committee approved the listening test with reference number QMREC2165. The Web Audio Evaluation Tool(Jilings et al., 2015) was used to set up the test and participants used Beyerdynamic DT-770 PRO studio headphones.

The subjects were among musicians, sound engineers or experienced in critical listening. The listening samples were obtained from the test subsets and each page of the test contained a reference sound, i.e. a recording from the original analog device. The aim of the test was to identify which sound is closer to the reference, and participants rated 6 different samples according to the similarity of these in relation to the reference sound.

Therefore, participants were informed what modeling task they were listening to, and were asked to rate the samples from 'least similar' to 'most similar'. This in a scale of 0 to 100, which was then mapped into a scale of 0 to 1. The samples consisted of a dry sample as anchor, outputs from the 4 different models and a hidden copy of the reference. The test is based on MUSHRA (Union, 2003).

3.2 Results

The training procedures were performed for each architecture and each modeling task: preamp corresponds to the vacuum-tube preamplifier, limiter to the transistor-based limiter amplifier, horn tremolo and horn chorale to the Leslie speaker rotating horn at fast and slow speeds respectively, and woofer tremolo and woofer chorale to the rotating woofer at the corresponding speeds. Then, the models were tested with samples from the test subset and the audio results are available online: https://mchijmma.github.io/DL-AFx/

The results of the listening test for al modeling tasks can be seen in FIG. 3.1 as notched box plots. The end of the notches represents a 95% confidence interval and the end of the boxes represent the first and third quartiles. Also, the green lines Illustrate the median rating and the purple circles represent outliers. In general, both anchors and hidden references have the lowest and highest median respectively. The perceptual findings match closely the objective metrics from FIG. 3.1, since the architectures that explicitly learn long-temporal dependencies, such as CRAFx and CWAFx outperform the rest of the models. Furthermore, for the woofer chorale task, the unsuccessful performance of the latter is also evidenced in perceptual ratings. This indicates that the latent-space Wavenet falls to learn low-frequency modulations such as the woofer chorale rotating rate.

For selected test samples of the preamp and limiter tasks and for all the different models, FIGS. 3.3 and 3.4 shows the input, reference, and output waveforms together with their respective spectrogram. Both in the time-domain and in the frequency-domain, it is observable that the waveforms and spectrograms are in line with the objective and subjective findings. To more closely display the performance of these nonlinear tasks, FIG. 3.5 shows a segment of the respective wave-forms. It can be seen how the different models match the waveshaping from the overdriven preamp as well as the attack waveshaping of the limiter when processing the onset of the test sample.

Regarding the Leslie speaker modeling task, FIGS. 3.6 to 3.9 show the different waveforms together with their respective modulation spectrum and spectrogram: FIG. 3.6 horn-tremolo, FIG. 3.7 woofer-tremolo, FIG. 3.8 horn-chorale and FIG. 3.9 woofer-chorale. From the spectra, it is noticeable that CRAFx and CWAFx introduce and match the amplitude and frequency modulations of the reference, whereas CAFX and WaveNet fail to accomplish the time-varying tasks.

3.3 Discussion

Nonlinear Task with Short-Term Memory—Preamp

The architectures that were designed to model nonlinear effects with short-term memory, such as CAFx and Wave-Net, were outperformed by the models that incorporate temporal dependencies. With CRAFx and CWAFx being the highest scoring model both objectively and perceptually. Although this task does not require along-term memory, the context input frames and latent-space recurrent and Wavenet layers from CRAFx and CWAFx respectively, benefited the modeling of the preamp. This performance improvement could be on account of the temporal behaviour present on the vacuum-tube amplifier, such as hysteresis or attack and release timings, although additional tests on the preamp might be required.

Given the successful results reported in Chapter 1 and Damskägg et al. (2019), which represent the state-of-the-art for nonlinear audio effects modeling, it is remarkable that the performance of these architectures (CAFx and WaveNet) is exceeded by CRAFx and CWAFx. It is worth noting that CAFx and WaveNet from Chapter 1 are trained with input frame sizes of 1024 samples, which could indicate a decrease in modeling capabilities when handing larger input frame sizes, such as 4096 samples. Similarly, the model from Damskägg et al. (2019) included 1 stack of dilated convolutions whereas the WaveNet architecture used 2.

Nevertheless, from FIG. 3.2a, we can conclude that al models successfully accomplished the modeling of the preamp. Most of the output audio is only slightly discernible from their target counterparts, with CRAFx and CWAFx being virtually indistinguishable from the real analog device.

Time-Dependent Nonlinear Task—Limiter

Since the limiter task includes long temporal dependencies such as a 1100 ms release gate, as expected, the architectures that include memory achieved a higher performance both objectively and subjectively. From FIG. 3.4b it can be seen that CAFx and WaveNet introduce high frequency information that is not present in the reference spectrogram. This could be an indication that the models compensate for their limitations when modeling information beyond one input frame, such as the distortion tone characteristic due to the long release time together with the variable ratio of the limiter. Furthermore, from FIG. 3.5b it is noticeable how each architecture models the attack behaviour of the limiter.

We can conclude that although all networks closely matched the reference target, it is CRAFx and CWAFx which achieved the exact saturation waveshaping characteristic of the audio processor. The latter is accentuated with the perceptual results from FIG. 3.2b, where CRAFx and CWAFx are again virtually indistinguishable from the reference target. While CAFx and WaveNet are ranked behind due to the lack of long-term memory capabilities, it is noteworthy that these models closely accomplished the desired waveform.

Time-Varying Task—Leslie Speaker

With respect to the horn tremolo and woofer tremolo modeling tasks, it can be seen that for both rotating speakers, CRAFx and CWAFx are rated highly whereas CAFx and WaveNet fail to accomplish these tasks. Thus, the perceptual findings from FIGS. 3.2c and 3.2d confirm the results obtained with the ms_mse metric and overall, the woofer task has a better matching that the horn task. Nevertheless, for CRAFx and CWAFx, the objective and subjective ratings for the horn tremolo task do not represent a significant decrease of performance and it can be concluded that both time-varying tasks were successfully modeled by these architectures.

CRAFx is perceptually ranked slightly higher than CWAFx. This indicates a closer matching of the reference amplitude and frequency modulations, which can be seen in the respective modulation spectra and spectrograms from FIG. 3.6 and FIG. 3.7.

For the horn chorale and woofer chorale modeling tasks, CRAFx and CWAFx successfully modeled the former while only CRAFx accomplished the woofer chorale task. Since the woofer chorale task corresponds to modulations lower than 0.8 Hz, we can conclude that Bi-LSTMs are more adequate than a latent-space WaveNet when modeling such low-frequency modulations. Furthermore, this is closely associated with the objective metrics reported in Section 2.4, where CWAFx obtained the highest mae values when modeling effects based on low-frequency modulation, such as vibrato.

In general, from FIG. 3.6 to FIG. 3.9, it is observable that the output waveforms do not match the waveforms of the references. This shows that the models are not overfitting to the waveforms of the training data and that the successful models are learning to introduce the respective amplitude and frequency modulations.

The models cannot replicate the exact reference waveform since the phase of the rotating speakers varies across the whole dataset. For this reason, the early stopping and model selection procedures of these tasks were based on the training loss rather than the validation loss. This is also the reason of the high mae scores across the Leslie speaker modeling tasks, due to these models applying the modulations yet without exactly matching their phase in the target data. Further implementation of a phase-invariant cost function could improve the performance of the different architectures.

CAFx and WaveNet were not able to accomplish these time-varying tasks. It is worth noting that both architectures try to compensate for long-term memory imitations with different strategies. It is suggested that CAFx wrongly introduces several amplitude modulations, whereas WaveNet tries to average the waveform envelope of the reference. This results in output audio significantly different from the reference, with WaveNet being perceptually rated as the lowest for the horn tremolo and horn chorale tasks. This also explains the ms_mse results from FIG. 3.1 for the woofer chorale task, where WaveNet achieves the best score since averaging the target waveform could be introducing the low-frequency amplitude modulations present in the reference audio.

3.4 Conclusion

In this chapter, we provide the different deep learning architectures from Chapters 1 and 2. We tested the models when modeling nonlinear effects with short-term and long-term memory such as a tube preamp and a transistor-based limiter; and nonlinear time-varying processors such as the rotating horn and woofer of a Leslie speaker cabinet.

Through objective perceptual-based metrics and subjective listening tests we found that across al modeling tasks, the architectures that incorporate Bi-LSTMs or, to a lesser extent, latent-space dilated convolutions to explicitly learn long temporal dependencies, outperform the rest of the models. With these architectures we obtain results that are virtually indistinguishable from the analog reference processors. Also, state-of-the-art DNN architectures for modeling nonlinear effects with short-term memory perform similarly when matching the preamp task and considerably approximate the limiter task, but fail when modeling the time-varying Leslie speaker tasks.

The nonlinear amplifier, rotating speakers and wooden cabinet from the Leslie speaker were successfully modeled. Nevertheless, the crossover filter was bypassed in the modeling tasks and the dry and wet audio were filtered accordingly. This was due to the limited frequency bandwidth of the bass and guitar samples, thus, this modeling task could be further provided with a more appropriate dataset such as Hammond organ recordings.

A cost function based on both time and frequency can be used to further improve the modeling capabilities of the models. In addition, since the highest ranked architectures use past and subsequent context input frames, it is possible to adapt these architectures to overcome this latency. Thus, real-time applications would benefit significantly from end-to-end DNNs that include long-term memory without resorting to large input frame sizes and the need for past and future context frames. Also, an end-to-end Wavenet architecture with a receptive field as large as the context input frames from CRAFx and CWAFx could also be provided for the time-varying modeling tasks.

Moreover, as shown in Damskägg et al. (2019), the introduction of controls as a conditioning input to the networks can be investigated, since the models are currently learning a static representation of the audio effect. Finally, applications beyond virtual analog can be implemented, for example, in the field of automatic mixing the models could be trained to learn a generalization from mixing practices.

4 Modeling Artificial Reverberation

In this chapter we present a deep learning architecture to model artificial reverberators such as plate and spring. Rate and spring reverberators are electromechanical audio processors mainly used for aesthetic reasons and characterized for their particular sonic qualities. The modeling of these reverberators remains an active research field due to their nonlinear and time-varying spatial response.

We provide the capabilities of DNNs to learn such highly nonlinear electromechanical responses. Therefore based on digital reverberators that use sparse FIR (SFIR) filters, we use domain knowledge from signal-processing systems and we propose the Convolutional recurrent and Sparse filtering audio effects modeling network (CSAFx).

Thus, we extend previous architectures by incorporating trainable FIR filters with sparsely placed coefficients in order to model noise-like and dispersive responses, such as those present in plate and spring devices. We also modify the Squeeze-and-Excitation (SE) blocks from CRAFX (see Section 2.1) in order to act as time-varying mixing gains between the direct sound and the reflections. Hence CSAFx represents a DSP-informed DNN for modeling artificial reverberators.

Based on the results of the virtual analog experiments from Chapter 3, we use CRAFx as baseline model and we also test its capabilities when modeling artificial reverberation. In order to measure the performance, we conduct a perceptual listening test and we also analyze how the given task is accomplished and what the model is actually learning.

Prior to this work, end-to-end DNNs have not yet been implemented to model artificial reverberators, i.e. learning from input-output data and applying the reverberant effect directly to the dry input audio. Although deep learning for dereverberation has become a heavily researched field (Feng et al., 2014; Han et al., 2015), applying artificial reverberation or modeling plate and spring reverb with DNNs has not been explored yet.

We report that CSAFx outperforms CRAFx, both perceptual and objective evaluations indicate that the proposed model successfully simulates the electromechanical devices and performs better than other DNNs for modeling audio effects.

4.1 Convolutional Recurrent and Sparse Filtering Network—CSAFx

The model builds on CRAFx and as well is completely based on time-domain input and works with raw and processed audio as input and output respectively. It is divided into three parts: adaptive front-end, latent-space and synthesis back-end. A block diagram is depicted in FIG. 4.1 and code is available online: https://github.com/mchijmma/modeling-plate-spring-reverb/tree/master/src and Table A.1 displays the number of parameters and computational processing times.

The adaptive front-end is exactly the same as the one from CRAFx (see Table 2.1). It follows the same time distributed convolutional and pooling layers, yielding a filter bank architecture of 32 channels which learns the latent representation Z. Likewise, the model learns long-term memory dependencies by having an input x which comprises the current audio frame x concatenated with the ±4 previous and subsequent frames. The input is described by Eq. (2.1). These frames are of size 4096 (256 ms) and sampled with a hop size of 50%.

Latent-Space

A block diagram of the latent-space can be seen in FIG. 4.2 and its structure is described in detail in Table 4.1. The latent-space has as its main objective to process Z into two latent representations, $Z1\hat{}$ and $Z2\hat{}$. The former corresponds to a set of envelope signals and the latter is used to create the set of sparse FIR filters $Z3\hat{}$.

The latent representation Z from the front-end corresponds to 9 rows of 64 samples and 32 channels, which can be unrolled into a feature map of 64 samples and 288 channels. The latent-space comprises two shared Bi-LSTM layers of 64 and 32 units with tan h as activation function. The output feature map from these Bi-LSTM layers is fed to two independent Bi-LSTM layers of 16 units. Each of these layers is followed by locally connected SAAFs as the nonlinearity, obtaining in this way $Z1\hat{}$ and $Z2\hat{}$. As shown in previous chapters, SAAFs can be used as nonlinearities or waveshapers in audio processing tasks.

We propose a SFIR layer where we follow the constraints of sparse pseudo-random reverberation algorithms (Vilmiki et al., 2012). Reverberant reflections are modeled via FIR filters with sparsely placed coefficients. These coefficients are usually obtained through a pseudo-random number sequence (e.g. velvet noise), which is based on discrete coefficient values such as −1 and +1, where each one of the coefficients follows an interval of Ts samples while al the other samples are zero.

Nevertheless, in SFIR, instead of using discrete coefficient values, each coefficient can take any continuous value within −1 to +1. Accordingly, each one of the coefficients is placed at a specific index position within each interval of Ts samples while the rest the samples are zero.

Thus, the SFIR layer processes $Z2\hat{}$ by two independent dense layers of 1024 units each. The dense layers are followed by a tan h and sigmoid function, whose outputs are the coefficient values (coeff) and their index position (idx) respectively. To obtain the specific idx value, the output of the sigmoid function is multiplied by Ts and a rounding down to the nearest integer is applied. This operation is not differentiable so we use an identity gradient as a backward pass approximation (Athalye et al., 2018). In order to have a high-quality reverberation, we use 2000 coefficients per second, thus, Ts=8 samples for a sampling rate of 16 kHz.

TABLE 4.1

Detailed architecture of the latent-space of CSAFx. This with an input frame size of 4096 samples and ±4 context frames.

| Layer - Output shape | | Output |
|---|---|---|
| Z (64, 288) | | |
| Bi-LSTM (64, 128) | | • |
| Bi-LSTM (64, 64) | | • |
| Bi-LSTM (64, 32) | Bi-LSTM (64, 32) | • |
| SAAF (64, 32) | SAAF (64, 32) | $\hat{Z}_1 \hat{Z}_2$ |
| • | Dense (1024, 32) Dense (1024, 32) | • • |
| • | Sparse Tensor (4096, 32) | • $\hat{Z}_3$ |

TABLE 4.2

Detailed architecture of the synthesis back-end of CSAFx. This with input frame size of 4096 samples and ±4 context frames.

| Layer - Output shape | | Output |
|---|---|---|
| $\hat{Z}_1$ (4096, 32) | $\hat{Z}_3$ (4096, 32) | |
| Unpooling (4096, 32) | R * $\hat{Z}_3$ (4096, 32) | $\hat{X}_3, \hat{X}_5$ |
| | $\hat{X}_3 \times \hat{X}_5$ (4096, 32) | $\hat{X}_2$ |
| $\hat{X}_2$ (4096, 32) | R (4096, 32) | |
| • | Dense (4096, 32) | • • |
| • | Dense (4096, 16) | • • |
| • | Dense (4096, 16) | • • |
| • | Dense (4096, 32) | • • |
| • | SAAF (4096, 32) | • $\hat{X}_4$ |
| Abs (4096, 32) | Abs (4096, 32) | • • |
| G-Avg (1, 32) | G-Avg (1, 32) | • • |

TABLE 4.2-continued

Detailed architecture of the synthesis back-end of CSAFx. This with input frame size of 4096 samples and ±4 context frames.

| Layer - Output shape | | Output |
|---|---|---|
| LSTM (1, 32) | LSTM (1, 32) | · · |
| Dense (1, 512) | Dense (1, 512) | · · |
| Dense (1, 32) | Dense (1, 32) | se1 se2 |
| se1 × $\hat{X}_2$ (4096, 32) | se2 × $\hat{X}_4$ (4096, 32) | $\hat{X}_{1.1} \hat{X}_{1.2}$ |
| $\hat{X}_{1.1} + \hat{X}_{1.2}$ (4096, 32) | | $\hat{X}_0$ |
| deConv1D (4096, 1) | | $\hat{y}$ |

Synthesis Back-End

The synthesis back-end can be seen in more detail in FIG. 4.3 and Table 4.2. The back-end uses the SFIR output Z3^, the envelopes Z1^ and the residual connection R to synthesize the waveform and accomplish the reverberation task. It comprises an unpooling layer, a convolution and multiplication operation, a DNN with SAAFs (DNN-SMF), two modified Squeeze-and-Excitation blocks (Hu et al., 2018) that incorporate LSTM layers (SE-LSTM) and a final convolutional layer.

Following the filter bank architecture: X3^ is obtained by upsampling Z1^ and the feature map X5^ is accomplished by the locally connected convolution between R and Z3^. As in CRAFx, R is obtained from X1 and corresponds to the frequency band decomposition of the current input frame $x^{(0)}$. X5^ is obtained with the following equation.

$$\hat{X}_5^{(i)} = R^{(i)} * \hat{Z}_3^{(i)} \forall i \in [1,32] \quad (4.1)$$

Where i denotes the ith row the feature maps, which follow a filter bank architecture of 32 channels. The result of this convolution can be seen as explicitly modeling a frequency dependent reverberation response with the incoming audio. Furthermore, due to the temporal dependencies learnt by the Bi-LSTMs, X5^ is able to represent from the onset response the late reflections of the reverberation task.

Then the feature map X2^ is the result of the element-wise multiplication of the reverberant response X5^ and the learnt envelopes X3^. The envelopes are applied in order to avoid audible artifacts between input frames (Järveläinen and Karjalainen, 2007).

$$\hat{X}_3 = \hat{X}_5 \times \hat{X}_4 \quad (4.2)$$

Secondly, the feature map X4^ is obtained when the waveshaping nonlinearities from the DNN-SAAF block are applied to R. The result of this operation comprises a learnt nonlinear transformation or waveshaping of the direct sound (see Section 1.1). As used in CRAFx, the DNN-SAAF block comprises 4 dense layers of 32, 16, 16 and 32 hidden units respectively. Each dense layer uses tan h as nonlinearity except for the last one, which uses a SAAF layer.

We propose an SE-LSTM block to act as a time-varying gain for X4^ and X2^. Since SE blocks explicitly and adaptively scale the channel-wise information of feature maps (Hu et al., 2018), we incorporate an LSTM layer in the SE architecture in order to include long-term context from the input. Each SE-LSTM builds on the SE blocks from Section 2.1 which are based on the architecture from (Kim et al., 2018).

The SE-LSTMs blocks comprise an absolute value operation and global average pooling operation followed by one LSTM and two dense layers of 32, 512 and 32 hidden units respectively. The LSTM and first dense layer are followed by a ReLu, while the last dense layer uses a sigmoid activation function. As depicted in FIG. 4.3, each SE-LSTM block process each feature map X4^ and X2^, thus, applying a frequency dependent time-varying mixing gain se1 and se2. The resulting feature maps X1.1^ and X1.2^ are added together in order to obtain X0^.

$$\hat{X}_{1.1} = se1 \times \hat{X}_2 \quad (4.3)$$

$$\hat{X}_{1.2} = se2 \times \hat{X}_4 \quad (4.4)$$

$$\hat{X}_0 = \hat{X}_{1.1} + \hat{X}_{1.2} \quad (4.5)$$

As in the previous deep learning architectures, the last layer corresponds to the deconvolution operation which is not trainable since its filters are the transposed weights of the first convolutional layer. The complete waveform is synthesized using a hann window and constant overlap-add gain. As shown in the previous CEQ, CAFx, CRAFx and CWAFx architectures, all convolutions are along the time dimension and all strides are of unit value. For each convolutional layer we use the same padding and dilation is not incorporated.

Overall, each SAAF is locally connected and each function comprises 25 intervals between −1 to +1 and each Bi-LSTM and LSTM have dropout and recurrent dropout rates of 0.1.

4.2 Experiments 4.2.1 Training

We follow the same pretraining initialization step as in CRAFx. Once the convolutional layers of the front-end and back-end are initialized, the latent-space Bi-LSTMs, SFIR, DNN-SAAF and SE-LSTM blocks are incorporated into the model, and all the weights are trained jointly based on the reverberation task.

The loss function to be minimized is based in time and frequency and described by:

$$loss = \alpha_1 MAE(y, \hat{y}) + \alpha_2 MSE(Y, \hat{Y}) \quad (4.6)$$

Where MAE is the mean absolute error and MSE is the mean squared error. Y and Y" are the logarithmic power magnitude spectra of the target and output respectively, and y and y" their respective waveforms. Prior to calculating the MAE, the following pre-emphasis filter is applied to y and y".

$$H(z) = 1 - 0.95z^{-1} \quad (4.7)$$

As shown in Damskägg et al. (2019), H(z) is a highpass filter that we apply in order to add more weight to the high frequencies. We use a 4096-point FFT to obtain Y and Y. In order to scale the time and frequency losses, we use 1.0 and 1e-4 as the loss weights α1 and α2 respectively. Explicit minimization in the frequency and time domains resulted crucial when modeling such complex reverberant responses. The attention to the high frequencies is further emphasized by incorporating the pre-emphasis filter and the logarithmic power spectrum in the time and frequency domain, respectively.

For both training steps, Adam (Kingma and Ba, 2015) is used as optimizer and we use the same early stopping procedure from Section 4.2.1. We use a patience value of 25 epochs if there is no improvement in the validation loss. Similarly, afterwards the model is fine-tuned further with the learning rate reduced by 25% and also a patience value of 25 epochs. The initial learning rate is 1e-4 and the batch size comprises the total number of frames per audio sample. We select the model with the lowest error for the validation subset.

4.2.2 Dataset

Plate reverberation is obtained from the IDMT-SMT-Audio-Effects dataset Stein et al. (2010), which corresponds to individual 2-second notes and covers the common pitch range of various electric guitars and bass guitars. We use raw and plate reverb notes from the bass guitar recordings. Spring reverberation samples are obtained by processing the electric guitar raw audio samples with the spring reverb tank Accutronics 4EB2C1B. It is worth noting that the plate reverb samples correspond to a VST audio plug-in, while the spring reverb samples are recorded using an analog reverb tank which is based on 2 springs placed in parallel.

For each reverb task we use 624 raw and effected notes and both the test and validation samples correspond to 5% of this subset each. The recordings are downsampled to 16 kHz and amplitude normalization is applied. Also, since the plate reverb samples have a fade-out applied in the last 0.5 seconds of the recordings, we process the spring reverb samples accordingly. The dataset is available online: https://zenodo.org/record/3746119

TABLE 4.3

Settings for each artificial reverberation modeling task.

| Fx | settings |
|---|---|
| plate | Smaertelectronix ambience: 'Gating Amount - 0', 'Gating Attack" - 10 ms', 'Gating Release - 10 ms', 'Decay Time - 2225 ms', 'Decay Diffusion - 50%', 'Decay Hold - off', 'Shape Size - 16%', 'Shape Predelay - 0 ms', 'Shape Width - 100%', 'Shape Quality - 100%', 'Shape Variation - 0', 'EQ Bass Frequency - 43 Hz', 'EQ Bass Gain - −7.8 dB', 'EQ Treble Frequency - 5044 Hz', 'EQ Treble Gain - −3.7 dB', 'Damping Bass Frequency - 158 Hz', 'Damping Bass Amount - 87%', 'Damping Treble Frequency - 8127 Hz', 'Damping Treble Amount - 32%', 'Dry - −Inf', 'Wet - 0 dB' |
| spring | Accutronics 4EB2C1B: 'Dry Mix - 0%', 'Wet Mix - 100%' |

4.2.3 Evaluation

Two objective metrics are used when testing the models with the various modeling tasks; mae, the energy-normalized mean absolute error; and mfcc_cosine, the mean cosine distance of the MFCCs (see Section 1.3.3).

As described in Section 3.1.5, we also conducted a perceptual listening test to measure the performance of the models. Thirty participants complete the test which took place at a professional listening room at Queen Mary University of London. The subjects were among musicians, sound engineers or experienced in critical listening. The audio was played via Beyerdynamic DT-770 PRO studio head-phones and the Web Audio Evaluation Tool (Jillings et al., 2015) was used to set up the test.

The participants were presented with samples from the test subset. Each page contained a reference sound, i.e. from the original plate or spring reverb. Participants were asked to rate 4 different samples according to the similarity of these in relation to the reference sound. The aim of the test was to identify which sound is closer to the reference. Thus, the test is based on the MUSHRA method (Union, 2003). The samples consisted of outputs from CSAFx, CRAFx, a hidden copy of the reference and a dry sample as hidden anchor.

4.3 Results & Analysis

In order to compare the reverberation modeling capabilities of CSAFx, we use CRAFx as baseline, which has proven capable of modeling complex electromechanical devices with long-term memory and low-frequency modulations such as the Leslie speaker (see Chapter 3). The latter presents an architecture similar to CSAFx, although its latent-space and back-end have been designed to explicitly learn and apply amplitude and frequency modulations in order to match time-varying audio effects. Both models are trained under the same procedure, tested with samples from the test dataset and the audio results are available online: https://mchijmma.github.io/modeling-plate-spring-reverb/

Table 4.4 shows the corresponding loss values from Eq. (4.6). The proposed model outperforms CRAFx in both tasks. It is worth mention that for plate reverb, the mean mae and mfcc_cosine values between input and target waveforms are 0.16 and 0.15, respectively. It was found that both models perform similarly well in terms of mae, with CSAFx achieving better results. Nevertheless, in terms of mfcc_cosine, the values obtained by CRAFx indicate that, perceptually, the dry notes are closer to the target than the outputs from this model.

For the spring reverb task, the mean mae and mfcc_cosine values between input and target waveforms are 0.22 and 0.34, respectively. In the same way, we can see a similar matching to the waveform, this based on the improvement of the mae values. Furthermore, based on the results of mfcc_cosine, it can be seen that only CSAFx is capable of improving the values of the dry recordings. For both plate and spring reverb tasks, the latter is further confirmed since the mean MSE values between input and target waveforms are 9.64 and 41.29, respectively.

The results of the listening test can be seen in FIG. 4.5 as a notched box plot. The end of the boxes represents the first and third quartiles, the end of the notches represents a 95% confidence interval, the green line depicts the median rating and the circles represent outliers. As expected, both anchor and reference have the lowest and highest median respectively. It is evident that for both plate and spring reverb tasks, CSAFx is rated highly whereas CRAFx fails to accomplish the reverberation tasks.

Thus, the perceptual findings confirm the results obtained with the loss, mae and mfcc_cosine metrics and likewise, plate models have a better matching that spring reverberators. These results are due to the fact that plate reverb samples correspond to a digital emulation of a plate reverberator, whereas spring reverb samples correspond to an analog reverb tank. Therefore, as expected, spring reverb samples represent a much more difficult task to model. Furthermore, the perceptual ratings and objective metric values for spring do not represent a significant decrease of performance, nevertheless, the modeling of spring late reflections could be further provided via a larger number of filters, different loss weights or input frame sizes.

Overall, the initial onset responses are being modeled more accurately, whereas the late reflections differ more prominently in the case of the spring, which as mentioned, in all the models it presents a higher loss. The models are introducing specific reflections that are not present in the input waveforms which closely match those of the respective targets. Also, CRAFx fails to match the high frequencies of the target, which goes along with the reported objective and perceptual scores. For CSAFx, the differences in the time and frequency domains in relation to the target, also correspond to the obtained loss values.

4.4 Conclusion

In this chapter, we introduced CSAFx: a signal processing-informed deep learning architecture for modeling artificial reverberators.

For this architecture we proposed the SFIR layer, therefore exploring the capabilities of DNNs to learn the coefficients of sparse FIR filters. Likewise, we introduced the SE-LSTM block in order to allow a DNN to learn time-varying mixing gains, which are used by CSAFx to dynamically mix the direct sound and the respective reflections. Thus introducing a more explainable network which also outperforms the previous RNN-based model.

A deep learning architecture may be able to emulate plate and spring reverberators and we measure the performance of the model through a listening test. We show CSAFx successfully matching the characteristic noise-like and dispersive responses of these nonlinear and time-varying audio processors.

Listening test results and perceptual-based metrics show that the model emulates closely the electromechanical reverberators and also achieves higher ratings than CRAFx. The latter corresponds to an audio effects modeling network which, in the previous chapter, has been proven to outperform several DNNs for black-box modeling of audio effects. Therefore, the results obtained by CSAFx are remarkable and we can conclude that the proposed architecture represents the state-of-the-art of deep learning for black-box modeling of artificial reverberators. From Table A.1, the computational processing times on both GPU and CPU are significant higher for CSAFx. Since these times were computed using the non real-time optimized python implementation, this higher computational cost could be due to the fact that CSAFx contains custom layers, such as SFIR, which have not been optimized within differentiable programming libraries such as tensorflow.

There is also provided additional systematic comparison between the proposed DNN and current analytical methods for modeling plate and spring reverb, such as numerical simulation or modal techniques. Also, modeling an actual electromechanical plate reverb may improve the CSAFx performance when modeling plate and spring reverberators.

The modeling of longer decay times and late reflections can also be implemented since the plate and spring reverb samples have a fade-out applied in the last 0.5 seconds of the recordings. Parametric models can be provided by including the respective controls as new input training data.

Likewise, the architecture can be further tested by modeling vintage digital reverberators or via convolution-based reverb applications. The latter brings applications within the fields of sound spatialization and room acoustics modeling.

Parametric models in accordance with each of the models and architecture herein disclosed could also be achieved since the models are learning a static representation of each audio effect modeling task. Therefore the behaviour of the parameters of the effect units can be modeled by including the respective controls as new input training data. Also this can be extended to 'presets' or set of controls.

The proposed models can operate via an offline or real-time implementation. Real-time models could be obtain, for example, via C++ optimization since processing times are already close to real-time temporal constraints. Causal models, i.e. without subsequent context frames, can also be implemented. This is due to the proposed architectures using both past and subsequent context input frames. Implementing causal models that use shorter input frame sizes could open the way to low-latency and real-time implementations.

The weights learnt by the latent-space DNN could be optimized with an analysis of the filters learnt by the convolutional layers of the front-end.

The weights learnt by the latent-space DNNs by the convolutional layers of the front-end could be modified during inference to alter the way the input audio is transformed. Therefore new transformations could be achieved which would not be possible by using common analog or digital audio processors. This can be used as a set of new controls for the deep learning-based effect.

The proposed architectures could be employed to model other types of audio processors. For example; audio effects with long temporal dependencies that are based on echo, such as feedback delay, slapback delay or tape-based delay. The proposed architectures are designed to model time-varying audio effects driven by low-frequency modulator signals or envelopes, however modeling stochastic effects, i.e. audio processors driven by noise, can also be obtained. For instance, a noise generator can be included in the synthesis back-end of these networks which can be scaled via SE or SE-LSTM layers. Also, dynamic equalisers which apply different EQ curves based on input signal level can be modeled with CRAFx or CWAFx architectures.

Completely different families of effects can also be provided. This includes audio-morphing, timbre transformations, time-frequency processors such as phase vocoder effects; time-segment processors such as time stretching, pitch shifting, time shuffling and granulation; spatial audio effects such as modeling of 3D loudspeaker setups or room acoustics; non-causal effects such as audio processors that include "lookahead" settings.

Adaptive digital audio effects, where low-level and perceptual features are extracted and mapped for the implementation of inter-channel cross-adaptive systems can also be implemented. Given an adaptive audio effects task, this mapping of sound features to control the parameters of other processors can be provided by jointly training various of the proposed architectures. The architectures can be used for style-learning tasks, where based on a target sound effected with a chain of audio effects, the models learn to replicate the same transformation to a different input audio.

Possible applications of these architectures are within the field of automatic mixing and mastering. Automatic linear and nonlinear processing can be implemented for an automatic mixing task, such as automatic EQ, compression, or reverberation. Furthermore, style-learning of a specific sound engineer could be implemented, where a network is trained with several tracks mixed by a sound engineer and finds a generalization from the engineer's mixing practices. Also, automatic post-production for a specific instrument across one or several genres could be learnt and implemented by the models.

Embodiments include a number of modifications and variations of the techniques as described above.

Applications beyond audio effects modeling and intelligent music production can also be implemented, for instance signal restoration methods such as undistortion, denoising and dereverberation.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

Methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), phase-change memory and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

REFERENCES

The following references are referred to throughout the present document and are all incorporated herein by reference.

Jonathan S Abel and David P Berners. A technique for nonlinear system measurement. In *121st Audio Engineering Society Convention*, 2006.

Jonathan S Abel, David P Berners, Sean Costello, and Julius O Smith. Spring reverb emulation using dispersive allpass filters in a waveguide structure. In *121st Audio Engineering Society Convention*, 2006.

Jonathan S Abel, David P Berners, and Aaron Greenblatt. An emulation of the emt 140 plate reverberator using a hybrid reverberator structure. In *127th Audio Engineering Society Convention*, 2009.

Jérôme Antoni and Johan Schoukens. A comprehensive study of the bias and variance of frequency-response-function measurements: Optimal window selection and overlapping strategies. *Automatica*, 43(10):1723-1736, 2007.

Kevin Arcas and Antoine Chaigne. On the quality of plate reverberation. *Applied Acoustics*, 71(2):147-156, 2010.

Anish Athalye, Nicholas Carlini, and David Wagner. Obfuscated gradients give a false sense of security: circumventing defenses to adversarial examples. In *International Conference on Machine Learning*, 2018.

Shaojie Bai, J Zico Kolter, and Vladlen Koltun. Convolutional sequence modeling revisited. In *6th International Conference on Learning Representations (ICLR)*, 2018.

Daniele Barchiesi and Joshua D. Reiss. Reverse engineering of a mix. *Journal of the Audio Engineering Society*, 58(7/8):563-576, 2010.

Stefan Bilbao. A digital plate reverberation algorithm. *Journal of the Audio Engineer-ing Society*, 55(3):135-144, 2007.

Stefan Bilbao. Numerical sound synthesis. Wiley Online Library, 2009.

Stefan Bilbao. Numerical simulation of spring reverberation. In *16th International Conference on Digital Audio Effects (DAFx-13)*, 2013.

Stefan Bilbao and Julian Parker. A virtual model of spring reverberation. *IEEE Transactions on Audio, Speech and Language Processing*, 18(4):799-808, 2009.

Stefan Bilbao, Kevin Arcas, and Antoine Chaigne. A physical model for plate reverberation. In *IEEE International Conference on Acoustics, Speech, and Signal Processing*, 2006.

Christopher M Bishop. *Pattern recognition and machine learning*. springer, 2006.

Merlijn Blaauw and Jordi Bonada. A neural parametric singing synthesizer. In Interspeech, 2017.

Ólafur Bogason and Kurt James Werner. Modeling circuits with operational transconductance amplifiers using wave digital filters. In 20th International Con-ference on Digital Audio Effects (DAFx-17), 2017.

Chi-Tsong Chen. *Linear system theory and design*. Oxford University Press, Inc., 1998.

Sharan Chetlur, Cliff Woolley, Philippe Vandermersch, Jonathan Cohen, John Tran, Bryan Catanzaro, and Evan Shelhamer. cuDNN: Efficient primitives for deep learning. *CoRR*, abs/1410.0759, 2014.

Kyunghyun Cho, Bart Van Merriënboer, Caglar Gulcehre, Dzmitry Bandanau, Fethi Bougares, Holger Schwenk, and Yoshua Bengio. Learning phrase repre-sentations using RNN encoder-decoder for statistical machine translation. arXiv preprint arXiv:1406.1078, 2014.

Francois Chollet. *Deep Learning with Python*. Manning Publications Co., 2018.

Eero-Pekka Damskägg, Lauri Juvela, Etienne Thuillier, and Vesa Välimäki. Deep learning for tube amplifier emulation. In *IEEE International Conference on Acous-tics, Speech, and Signal Processing (ICASSP)*, 2019.

Brecht De Man, Joshua D Reiss, and Ryan Stables. Ten years of automatic mixing. In Proceedings of the 3rd Workshop on Intelligent Music Production, 2017.

Giovanni De Sanctis and Augusto Sarti. Virtual analog modeling in the wave-digital domain. *IEEE Transactions on Audio, Speech, and Language Processing*, 2009.

Junqi Deng and Yu-Kwong Kwok. Automatic chord estimation on seventhsbass chord vocabulary using deep neural network. In *IEEE International Conference on Acoustics, Speech and Signal Processing (ICASSP)*, 2016.

Sander Dieleman and Benjamin Schrauwen. End-to-end learning for music audio. In *International Conference on Acoustics, Speech and Signal Processing (ICASSP)*. IEEE, 2014.

Michele Ducceschi and Craig J Webb. Plate reverberation: Towards the develop-ment of a real-time physical model for the working musician. In *International Congress on Acoustics (ICA)*, 2016.

John Duchi, Elad Hazan, and Yoram Singer. Adaptive subgradient methods for online learning and stochastic optimization. *Journal of machine learning research*, 12(July):2121-2159, 2011.

Simon Durand, Juan P Bello, Bertrand David, and Gaël Richard. Downbeat track-ing with multiple features and deep neural networks. In *IEEE International Conference on Acoustics, Speech and Signal Processing (ICASSP)*, 2015.

Douglas Eck and Juergen Schmidhuber. A first look at music composition using lstm recurrent neural networks. *Istituto Dalle Molle Di Studi Sull Intelligenza Artificiale*, 103, 2002.

Felix Eichas and *Udo* Zolzer. Black-box modeling of distortion circuits with block-oriented models. In 19th International Conference on Digital Audio Effects (DAFx-16), 2016.

Felix Eichas and Udo Zölzer. Virtual analog modeling of guitar amplifiers with wiener-hammerstein models. In *44th Annual Convention on Acoustics*, 2018.

Felix Eichas, Marco Fink, Martin Holters, and *Udo* Zolzer. Physical modeling of the mxr phase 90 guitar effect pedal. In 17th International Conference on Digital Audio Effects (DAFx-14), 2014.

Felix Eichas, Etienne Gerat, and Udo Zölzer. Virtual analog modeling of dynamic range compression systems. In *142nd Audio Engineering Society Convention*, 2017.

Jesse Engel, Cinjon Resnick, Adam Roberts, Sander Dieleman, Mohammad Norouzi, Douglas Eck, and Karen Simonyan. Neural audio synthesis of musical notes with wavenet autoencoders. *34th International Conference on Machine Learning*, 2017.

Jesse Engel, Lamtharn Hantrakul, Chenjie Gu, and Adam Roberts. DDSP: Dif-ferentiable digital signal processing. In *8th International Conference on Learning Representations (ICLR)*, 2020.

Dumitru Erhan, Yoshua Bengio, Aaron Courville, and Pascal Vincent. Visualizing higher-layer features of a deep network. *University of Montreal*, 1341(3):1, 2009.

Angelo Farina. Simultaneous measurement of impulse response and distortion with a swept-sine technique. In *108th Audio Engineering Society Convention*, 2000.

Xue Feng, Yaodong Zhang, and James Glass. Speech feature denoising and dere-verberation via deep autoencoders for noisy reverberant speech recognition. In *IEEE International Conference on Acoustics, Speech, and Signal Processing*, 2014.

Benjamin Friedlander and Boaz Porat. The modified Yule-Walker method of ARMA spectral estimation. *IEEE Transactions on Aerospace and Electronic Systems*, (2): 158-173, 1984.

Todor Ganchev, Nikos Fakotakis, and George Kokkinakis. Comparative evaluation of various mfcc implementations on the speaker verification task. In *International Conference on Speech and Computer*, 2005.

Patrick Gaydecki. *Foundations of digital signal processing: theory, algorithms and hard-ware design*, volume 15. Iet, 2004.

Etienne Gerat, Felix Eichas, and Udo Zölzer. Virtual analog modeling of a urei 1176 ln dynamic range control system. In *143rd Audio Engineering Society Conven-tion*, 2017.

Felix A Gers, Jürgen Schmidhuber, and Fred Cummins. Learning to forget: Continual prediction with LSTM. IET, 1999.

Dimitrios Giannoulis, Michael Massberg, and Joshua D Reiss. Parameter automa-tion in a dynamic range compressor. *Journal of the Audio Engineering Society*, 61 (10):716-726, 2013.

Pere Lluis Gilabert Pinal, Gabriel Montoro Lopez, and Eduardo Bertran Alberti. On the wiener and hammerstein models for power amplifier predistortion. In *IEEE Asia-Pacific Microwave Conference*, 2005.

Xavier Glorot and Yoshua Bengio. Understanding the difficulty of training deep feedforward neural networks. In the 13th International Conference on Artificial Intelligence and Statistics, 2010.

Luke B Godfrey and Michael S Gashler. A continuum among logarithmic, linear, and exponential functions, and its potential to improve generalization in neu-ral networks. In *7th IEEE International Joint Conference on Knowledge Discovery, Knowledge Engineering and Knowledge Management*, 2015.

Ian Goodfellow, Yoshua Bengio, and Aaron Courville. *Deep learning*. MIT press, 2016.

Alex Graves and Jürgen Schmidhuber. Framewise phoneme classification with bidirectional lstm and other neural network architectures. *Neural Networks*, 18 (5-6):602-610, 2005.

Alex Graves, Abdel-rahman Mohamed, and Geoffrey Hinton. Speech recognition with deep recurrent neural networks. In *IEEE International Conference on Acous-tics, Speech, and Signal Processing (ICASSP)*, 2013.

Aaron B Greenblatt, Jonathan S Abel, and David P Berners. A hybrid reverberation crossfading technique. In *IEEE International Conference on Acoustics, Speech, and Signal Processing*, 2010.

Sina Hafezi and Joshua D. Reiss. Autonomous multitrack equalization based on masking reduction. *Journal of the Audio Engineering Society*, 63(5):312-323, 2015.

Anna Hagenblad. *Aspects of the identification of Wiener models*. PhD thesis, Linköpings Universitet, 1999.

Stefan L Hahn. *Hilbert transforms in signal processing*, volume 2. Artech House Boston, 1996.

Philippe Hamel, Matthew E P Davies, Kazuyoshi Yoshii, and Masataka Goto. Trans-fer learning in MIR: Sharing learned latent representations for music audio classification and similarity. In *14th International Society for Music Information Retrieval Conference (ISMIR)*, 2013.

Jiawei Han, Jian Pei, and Micheline Kamber. *Data mining: concepts and techniques*. Elsevier, 2011.

Kun Han, Yuxuan Wang, DeLiang Wang, William S Woods, Ivo Merks, and Tao Zhang. Learning spectral mapping for speech dereverberation and denoising. *IEEE Transactions on Audio, Speech and Language Processing*, 23(6):982-992, 2015.

Yoonchang Han, Jaehun Kim, and Kyogu Lee. Deep convolutional neural net-works for predominant instrument recognition in polyphonic music. *IEEE/ACM Transactions on Audio, Speech, and Language Processing*, 25(1): 208-221, 2016.

Aki Härmä, Matti Karjalainen, Lauri Savioja, Vesa Välimäki, Unto K Laine, and Jyri Huopaniemi. Frequency-warped signal processing for audio applications. *Journal of the Audio Engineering Society*, 48(11):1011-1031, 2000.

Scott H Hawley, Benjamin Colburn, and Stylianos I Mimilakis. SignalTrain: Pro-filing audio compressors with deep neural networks. In *147th Audio Engineering Society Convention*, 2019.

Kaiming He, Xiangyu Zhang, Shaoqing Ren, and Jian Sun. Deep residual learn-ing for image recognition. In *IEEE Conference on Computer Vision and Pattern Recognition*, 2016.

Thomas Hélie. On the use of volterra series for real-time simulations of weakly nonlinear analog audio devices: Application to the moog ladder filter. In 9th International Conference on Digital Audio Effects (DAFx-06), 2006.

Clifford A Henricksen. Unearthing the mysteries of the leslie cabinet. *Recording Engineer/Producer Magazine*, 1981.

Jorge Herrera, Craig Hanson, and Jonathan S Abel. Discrete time emulation of the leslie speaker. In *127th Audio Engineering Society Convention*, 2009.

Marcel Hilsamer and Stephan Herzog. A statistical approach to automated of-fline dynamic processing in the audio mastering process. In 17th International Conference on Digital Audio Effects (DAFx-14), 2014.

Sepp Hochreiter and Jurgen Schmidhuber. Long short-term memory. *Neural com-putation*, 9(8):1735-1780, 1997.

Martin Holters and Julian D Parker. A combined model for a bucket brigade device and its input and output filters. In 21st International Conference on Digital Audio Effects (DAFx-17), 2018.

Martin Holters and Udo Zölzer. Physical modelling of a wah-wah effect pedal as a case study for application of the nodal dk method to circuits with variable parts. In 14th International Conference on Digital Audio Effects (DAFx-11), 2011.

Le Hou, Dimitris Samaras, Tahsin M Kurc, Yi Gao, and Joel H Saltz. Neural net-works with smooth adaptive activation functions for regression. arXiv preprint arXiv: 1608.06557, 2016.

Le Hou, Dimitris Samaras, Tahsin M Kurc, Yi Gao, and Joel H Saltz. Convnets with smooth adaptive activation functions for regression. In 20*th International Conference on Artificial Intelligence and Statistics (AISTATS)*, 2017.

Jie Hu, Li Shen, and Gang Sun. Squeeze-and-excitation networks. In *IEEE Confer-ence on Computer Vision and Pattern Recognition*, 2018.

Allen Huang and Raymond Wu. Deep learning for music. *CoRR*, abs/1606.04930, 2016.

Eric J Humphrey and Juan P Bello. Rethinking automatic chord recognition with convolutional neural networks. In 11*th International Conference on Machine Learn-ing and Applications*, 2012.

Eric J Humphrey and Juan P Bello. From music audio to chord tablature: Teaching deep convolutional networks to play guitar. In *IEEE international conference on acous-tics, speech and signal processing (ICASSP)*, 2014.

Antti Huovilainen. Enhanced digital models for analog modulation effects. In 8th International Conference on Digital Audio Effects (DAFx-05), 2005.

Leland B Jackson. Frequency-domain Steiglitz-McBride method for least-squares IIR filter design, ARMA modeling, and periodogram smoothing. *IEEE Signal Processing Letters*, 15:49-52, 2008.

Hanna Järveläinen and Matti Karjalainen. Reverberation modeling using velvet noise. In 30*th Audio Engineering Society International Conference*, 2007.

Nicholas Jillings, Brecht De Man, David Moffat, and Joshua D Reiss. Web Audio Evaluation Tool: A browser-based listening test environment. In 12*th Sound and Music Computing Conference*, 2015.

Jean-Marc Jot and Antoine Chaigne. Digital delay networks for designing artificial reverberators. In 90*th Audio Engineering Society Convention*, 1991.

Matti Karjalainen, Teemu Maki-Patola, Aki Kanerva, and Antti Huovilainen. Vir-tual air guitar. *Journal of the Audio Engineering Society*, 54(10):964-980, 2006.

Roope Kiiski, Fabián Esqueda, and Vesa Valimaki. Time-variant gray-box mod-eling of a phaser pedal. In 19th International Conference on Digital Audio Effects (DAFx-16), 2016.

Taejun Kim, Jongpil Lee, and Juhan Nam. Sample-level CNN architectures for music auto-tagging using raw waveforms. In *IEEE International Conference on Acoustics, Speech, and Signal Processing (ICASSP)*, 2018.

Diederik Kingma and Jimmy Ba. Adam: A method for stochastic optimization. In 3rd International Conference on Learning Representations (ICLR), 2015.

David M Koenig. *Spectral analysis of musical sounds with emphasis on the piano*. OUP Oxford, 2014.

Filip Korzeniowski and Gerhard Widmer. Feature learning for chord recognition: The deep chroma extractor. In 17*th International Society for Music Information Retrieval Conference (ISMIR)*, 2016.

Oliver Kröning, Kristjan Dempwolf, and Udo Zölzer. Analysis and simulation of an analog guitar compressor. In 14th International Conference on Digital Audio Effects (DAFx-11), 2011.

Walter Kuhl. The acoustical and technological properties of the reverberation plate. E. B. U. Review, 49, 1958.

Yann A LeCun, Léon Bottou, Genevieve B Orr, and Klaus-Robert Müller. Efficient backprop. *Neural networks: Tricks of the trade*, pages 9-48, 2012.

Honglak Lee, Peter Pham, Yan Largman, and Andrew Y Ng. Unsupervised feature learning for audio classification using convolutional deep belief networks. In *Advances in neural information processing systems*, pages 1096-1104, 2009.

Jongpil Lee, Jiyoung Park, Keunhyoung Luke Kim, and Juhan Nam. SampleCNN: End-to-end deep convolutional neural networks using very small filters for mu-sic classification. *Applied Sciences*, 8(1):150, 2018.

Keun Sup Lee, Nicholas J Bryan, and Jonathan S Abel. Approximating measured reverberation using a hybrid fixed/switched convolution structure. In 13th In-ternational Conference on Digital Audio Effects (DAFx-10), 2010.

Teck Yian Lim, Raymond A Yeh, Yijia Xu, Minh N Do, and Mark Hasegawa-Johnson. Time-frequency networks for audio super-resolution. In *IEEE Inter-national Conference on Acoustics, Speech and Signal Processing (ICASSP)*, 2018.

Zheng Ma, Joshua D Reiss, and Dawn A A Black. Implementation of an intelligent equalization tool using yule-walker for music mixing and mastering. In 134*th Audio Engineering Society Convention*, 2013.

Zheng Ma, Brecht De Man, Pedro D L Pestana, Dawn A A Black, and Joshua D Reiss. Intelligent multitrack dynamic range compression. *Journal of the Audio Engineering Society*, 63(6):412-426, 2015.

Jaromír Macák. Simulation of analog flanger effect using BBD circuit. In 19th International Conference on Digital Audio Effects (DAFx-16), 2016.

Jacob A Maddams, Saoirse Finn, and Joshua D Reiss. An autonomous method for multi-track dynamic range compression. In 15th International Conference on Digital Audio Effects (DAFx-12), 2012.

EP MatthewDavies and Sebastian Bock. Temporal convolutional networks for mu-sical audio beat tracking. In 27*th IEEE European Signal Processing Conference (EU-SIPCO)*, 2019.

Daniel Matz, Estefanía Cano, and Jakob Abeßer. New sonorities for early jazz recordings using sound source separation and automatic mixing tools. In 16*th International Society for Music Information Retrieval Conference (ISMIR)*, 2015.

Josh H McDermott and Eero P Simoncelli. Sound texture perception via statistics of the auditory periphery: evidence from sound synthesis. *Neuron*, 71, 2011.

Martin McKinney and Jeroen Breebaart. Features for audio and music classifica-tion. In 4*th International Society for Music Information Retrieval Conference (ISMIR)*, 2003.

Soroush Mehri, Kundan Kumar, Ishaan Gulrajani, Rithesh Kumar, Shubham Jain, Jose Sotelo, Aaron Courville, and Yoshua Bengio. SampleRNN: An uncondi-tional end-toend neural audio generation model. In *5th International Conference on Learning Representations. ICLR*, 2017.

StylianoslMimilakis, Konstantinos Drossos, Andreas Floros, and Dionysios Katerelos. Automated tonal balance enhancement for audio mastering appli-cations. In *134th Audio Engineering Society Convention*, 2013.

StylianoslMimilakis, Konstantinos Drossos, Tuomas Virtanen, and Gerald Schuller. Deep neural networks for dynamic range compression in mastering applications. In *140th Audio Engineering Society Convention*, 2016.

Stephan Möller, Martin Gromowski, and Udo Zölzer. A measurement technique for highly nonlinear transfer functions. In *5th International Conference on Digital Audio Effects (DAFx-02)*, 2002.

Brian C J Moore. *An introduction to the psychology of hearing*. Brill, 2012

James A Moorer. About this reverberation business. *Computer music journal*, pages 13-28, 1979.

M Narasimha and A Peterson. On the computation of the discrete cosine trans-form. *IEEE Transactions on Communications*, 26(6):934-936, 1978.

Aaron van den Oord, Sander Dieleman, Heiga Zen, Karen Simonyan, Oriol Vinyals, Alex Graves, Nal Kalchbrenner, Andrew Senior, and Koray Kavukcuoglu. Wavenet: A generative model for raw audio. In *CoRR abs/1609.03499*, 2016.

Jyri Pakarinen and David T Yeh. A review of digital techniques for modeling vacuum-tube guitar amplifiers. *Computer Music Journal*, 33(2):85-100, 2009.

Bryan Pardo, David Little, and Darren Gergle. Building a personalized audio equalizer interface with transfer learning and active learning. In *2nd International ACM Workshop on Music Information Retrieval with User-Centered and Multimodal Strategies*, 2012.

Julian Parker. Efficient dispersion generation structures for spring reverb emula-tion. *EURASIP Journal on Advances in Signal Processing*, 2011a.

Julian Parker. A simple digital model of the diode-based ring-modulator. In *14th International Conference on Digital Audio Effects (DAFx-11)*, 2011b.

Julian Parker and Stefan Bilbao. Spring reverberation: A physical perspective. In *12th International Conference on Digital Audio Effects (DAFx-09)*, 2009.

Julian Parker and Fabian Esqueda. Modelling of nonlinear state-space systems using a deep neural network. In *22nd International Conference on Digital Audio Effects (DAFx-19)*, 2019.

Razvan Pascanu, Tomas Mikolov, and Yoshua Bengio. On the difficulty of training recurrent neural networks. In *International Conference on Machine Learning*, 2013.

Roy D Patterson. Auditory filters and excitation patterns as representations of frequency resolution. *Frequency selectivity in hearing*, 1986.

Jussi Pekonen, Tapani Pihlajamäki, and Vesa Valimaki. Computationally efficient hammond organ synthesis. In *14th International Conference on Digital Audio Effects (DAFx-11)*, 2011.

Enrique Perez-Gonzalez and Joshua D. Reiss. Automatic equalization of multi-channel audio using cross-adaptive methods. In *127th Audio Engineering Society Convention*, 2009.

Enrique Perez-Gonzalez and Joshua D Reiss. Automatic mixing. *DAFX: Digital Audio Effects, Second Edition*, pages 523-549, 2011.

Pedro Duarte Leal Gomes Pestana. *Automatic mixing systems using adaptive digital audio effects*. PhD thesis, Universidade Católica Portuguesa, 2013.

George M Phillips and Peter J Taylor. *Theory and applications of numerical analysis*. Elsevier, 1996.

Jordi Pons, Oriol Nieto, Matthew Prockup, Erik Schmidt, Andreas Ehmann, and Xavier Serra. End-to-end learning for music audio tagging at scale. In *31st Conference on Neural Information Processing Systems*, 2017.

Miller Puckette. *The theory and technique of electronic music*. World Scientific Pub-lishing Company, 2007.

Colin Raffel and Julius O Smith. Practical modeling of bucket-brigade device circuits. In *13th International Conference on Digital Audio Effects (DAFx-10)*, 2010.

Jussi Rämö and Vesa Valimaki. Neural third-octave graphic equalizer. In *22nd International Conference on Digital Audio Effects (DAFx-19)*, 2019.

Dale Reed. A perceptual assistant to do sound equalization. In *5th International Conference on Intelligent User Interfaces*, pages 212-218. ACM, 2000.

Joshua D Reiss and Andrew McPherson. *Audio effects: theory, implementation and application*. CRC Press, 2014.

Dario Rethage, Jordi Pons, and Xavier Serra. A wavenet for speech denoising. In *IEEE International Conference on Acoustics, Speech and Signal Processing (ICASSP)*, 2018.

David Ronan, Zheng Ma, Paul Mc Namara, Hatice Gunes, and Joshua D Reiss. Automatic minimisation of masking in multitrack audio using subgroups. *IEEE Transactions on Audio, Speech, and Language processing*, 2018.

Olaf Ronneberger, Philipp Fischer, and Thomas Brox. U-net: Convolutional net-works for biomedical image segmentation. In *International Conference on Medical Image Computing and Computer-Assisted Intervention*, 2015.

Per Rubak and Lars G Johansen. Artificial reverberation based on a pseudo-random impulse response II. In *106th Audio Engineering Society Convention*, 1999.

Andrew T Sabin and Bryan Pardo. A method for rapid personalization of audio equalization parameters. In *17th ACM International Conference on Multimedia*, 2009.

Jan Schlüter and Sebastian Böck. Musical onset detection with convolutional neu-ral networks. In *6th International Workshop on Machine Learning and Music*, 2013.

Jan Schlüter and Sebastian Böck. Improved musical onset detection with convolu-tional neural networks. In *IEEE International Conference on Acoustics, Speech and Signal Processing (ICASSP)*, 2014.

Thomas Schmitz and Jean-Jacques Embrechts. Nonlinear real-time emulation of a tube amplifier with a long short time memory neural-network. In *144th Audio Engineering Society Convention*, 2018.

Manfred R Schroeder and Benjamin F Logan. "Colorless" artificial reverberation. *IRE Transactions on Audio*, (6): 209-214, 1961.

Mike Schuster and Kuldip K Paliwal. Bidirectional recurrent neural networks. *IEEE transactions on Signal Processing*, 45(11):2673-2681, 1997.

Di Sheng and György Fazekas. Automatic control of the dynamic range com-pressor using a regression model and a reference sound. In *20th International Conference on Digital Audio Effects (DAFx-17)*, 2017.

Di Sheng and György Fazekas. A feature learning siamese model for intelligent control of the dynamic range compressor. In *International Joint Conference on Neural Networks (IJCNN)*, 2019.

Siddharth Sigtia and Simon Dixon. Improved music feature learning with deep neural networks. In *IEEE International Conference on Acoustics, Speech and Signal Processing (ICASSP)*, 2014.

Siddharth Sigtia, Emmanouil Benetos, Nicolas Boulanger-Lewandowski, Tillman Weyde, Artur S d'Avila Garcez, and Simon Dixon. A hybrid recurrent neural network for music transcription. In *IEEE international conference on acoustics, speech and signal processing (ICASSP)*, 2015.

Siddharth Sigtia, Emmanouil Benetos, and Simon Dixon. An end-to-end neural network for polyphonic piano music transcription. *IEEE/ACM Transactions on Audio, Speech, and Language Processing*, 24(5):927-939, 2016.

Julius O Smith. *Introduction to digital filters: with audio applications*, volume 2. W3K Publishing, 2007.

Julius O Smith. *Physical audio signal processing: For virtual musical instruments and audio effects*. W3K Publishing, 2010.

Julius O Smith and Jonathan S Abel. Bark and ERB bilinear transforms. *IEEE Transactions on Speech and Audio Processing*, 7(6):697-708, 1999.

Julius O Smith, Stefania Serafin, Jonathan Abel, and David Berners. Doppler simu-lation and the leslie. In *5th International Conference on Digital Audio Effects (DAFx-02)*, 2002.

Mirko Solazzi and Aurelio Uncini. Artificial neural networks with adaptive multi-dimensional spline activation functions. In *IEEE International Joint Conference on Neural Networks (IJCNN)*, 2000.

Michael Stein, Jakob Abeßer, Christian Dittmar, and Gerald Schuller. Automatic detection of audio effects in guitar and bass recordings. In *128th Audio Engineer-ing Society Convention*, 2010.

Karl Steinberg. Steinberg virtual studio technology (VST) plug-in specification 2.0 software development kit. *Hamburg: Steinberg Soft-und Hardware GMBH*, 1999.

Dan Stowell and Mark D Plumbley. Automatic large-scale classification of bird sounds is strongly improved by unsupervised feature learning. *PeerJ*, 2:e488, 2014.

Bob L Sturm, Joao Felipe Santos, Oded Ben-Tal, and Iryna Korshunova. Music transcription modelling and composition using deep learning. In *1st Conference on Computer Simulation of Musical Creativity*, 2016.

Somsak Sukittanon, Les E Atlas, and James W Pitton. Modulation-scale analysis for content identification. *IEEE Transactions on Signal Processing*, 52, 2004.

Tijmen Tieleman and Geoffrey Hinton. RMSprop: Divide the gradient by a run-ning average of its recent magnitude. *COURSERA: Neural networks for machine learning*, 4(2):26-31, 2012.

Aurelio Uncini. Audio signal processing by neural networks. *Neurocomputing*, 55 (3-4):593-625, 2003.

International Telecommunication Union. Recommendation ITU-R BS.1534-1: Method for the subjective assessment of intermediate quality level of coding systems. 2003.

Vesa Välimäki and Joshua D. Reiss. All about audio equalization: Solutions and frontiers. *Applied Sciences*, 6(5): 129, 2016.

Vesa Välimäki, Julian Parker, and Jonathan S Abel. Parametric spring reverberation effect. *Journal of the Audio Engineering Society*, 58(7/8):547-562, 2010.

Vesa Välimäki, Julian D Parker, Lauri Savioja, Julius O Smith, and Jonathan S Abel. Fifty years of artificial reverberation. *IEEE Transactions on Audio, Speech, and Language Processing*, 20(5):1421-1448, 2012.

Aaron Van den Oord, Sander Dieleman, and Benjamin Schrauwen. Deep content-based music recommendation. In *Advances in Neural Information Processing Sys-tems*, pages 2643-2651, 2013.

Shrikant Venkataramani, Jonah Casebeer, and Paris Smaragdis. Adaptive front-ends for end-to-end source separation. In *31st Conference on Neural Information Processing Systems*, 2017.

Vincent Verfaille, U. Zolzer, and Daniel Arfib. Adaptive digital audio effects (A-DAFx): A new class of sound transformations. *IEEE Transactions on Audio, Speech and Language Processing*, 14(5):1817-1831, 2006.

Xinxi Wang and Ye Wang. Improving content-based and hybrid music recommen-dation using deep learning. In *22nd International Conference on Multimedia*, pages 627-636. ACM, 2014.

Kurt J Werner, W Ross Dunkel, and Francois G Germain. A computational model of the hammond organ vibrato/chorus using wave digital filters. In *19th Inter-national Conference on Digital Audio Effects (DAFx-16)*, 2016.

Silvin Willemsen, Stefania Serafin, and Jesper R Jensen. Virtual analog simula-tion and extensions of plate reverberation. In *14th Sound and Music Computing Conference*, 2017.

Alec Wright, Eero-Pekka Damskagg, and Vesa Välimäki. Real-time black-box mod-elling with recurrent neural networks. In *22nd International Conference on Digital Audio Effects (DAFx-19)*, 2019.

David T Yeh. Automated physical modeling of nonlinear audio circuits for real-time audio effects part II: BJT and vacuum tube examples. *IEEE Transactions on Audio, Speech, and Language Processing*, 20, 2012.

David T Yeh and Julius O Smith. Simulating guitar distortion circuits using wave digital and nonlinear state-space formulations. In *11th International Conference on Digital Audio Effects (DAFx-08)*, 2008.

David T Yeh, Jonathan S Abel, Andrei Vladimirescu, and Julius O Smith. Numeri-cal methods for simulation of guitar distortion circuits. *Computer Music Journal*, 32(2): 23-42, 2008.

David T Yeh, Jonathan S Abel, and Julius O Smith. Automated physical modeling of nonlinear audio circuits for real-time audio effects part I: Theoretical develop-ment. *IEEE Transactions on Audio, Speech, and Language Processing*, 18(4):728-737, 2010.

Matthew D Zeiler and Rob Fergus. Visualizing and understanding convolutional networks. In *European conference on computer vision*. Springer, 2014.

Zhichen Zhang, Edward Olbrych, Joseph Bruchalski, Thomas J McCormick, and David L Livingston. A vacuum-tube guitar amplifier model using long/short-term memory networks. In *IEEE SoutheastCon*, 2018.

Udo Zölzer. *DAFX: digital audio effects*. John Wiley & Sons, 2011.

Acronyms

AI Artificial Intelligence
BBD Bucket Brigade Delay
Bi-LSTM Bidirectional Long Short-Term Memory
CNN Convolutional Neural Network
CAFx Convolutional audio effects modeling network
CEQ Convolutional EQ modeling network
CRAFx Convolutional Recurrent audio effects modeling network
CWAFx Convolutional and WaveNet audio effects modeling network
CSAFx Convolutional recurrent Sparse filtering audio effects modeling network
CPU Central Processing Unit dBFS Decibels Relative to Full Scale DCT Discrete Cosine
   Transform DNN Deep Neural Network
DRC Dynamic Range Compression
DSP Digital Signal Processing
EQ Equalization
ERB Equivalent Rectangular Bandwidth
FIR Finite Impulse Response
FC Fully Connected
FFT Fast Fourier Transform
Fx Effects
GPU Graphics Processing Unit
IIR Infinite Impulse Response
JFET Junction Field Effect Transistor
KL Kullback-Leibler divergence
LC Locally Connected
TI Linear Time Invariant
LSTM Long Short-Term Memory
MAE Mean Absolute Error
MFCC Mel-Frequency Cepstral Coefficients
MSE Mean Squared Error
OTA Operational Transconductance Amplifier
ReLU Rectifier Linear Unit
RNN Recurrent Neural Network
SAAF Smooth Adaptive Activation Function
SFIR Sparse FIR
SGD Stochastic Gradient Descent
STFT Short-Time Fourier Transform
VST Virtual Studio Technology
WaveNet Feedforward Wavenet audio effects modeling network
WDF Wave Digital Filter Appendix A—Computational Complexity The computational processing times were calculated with a Titan XP GPU and an Intel Xeon E5-2620 CPU. We use input frames of size 4096 and sampled with a hop size of 2048 samples and it corresponds to the time a model takes to process one batch, i.e. the total number of frames within a 2-second audio sample. GPU and CPU times are reported using the non real-time optimized python implementation. Table A.1 shows the number of trainable parameters and processing times across all the models

TABLE A.1

Number of parameters and processing times across various models.

| model | number of parameters | GPU time (s) | CPU time (s) |
|---|---|---|---|
| CEQ | 561,473 | 0.0336 | 0.4811 |
| CAFx | 604,545 | 0.0842 | 1.2939 |
| WaveNet | 1,707,585 | 0.0508 | 1.0233 |
| CRAFx | 275,073 | 0.4066 | 2.8706 |
| CWAFx | 205,057 | 0.0724 | 2.9552 |
| CSAFx | 410,977 | 0.752 | 4.5681 |

The invention claimed is:
1. A computer-implemented method of processing audio data, the method comprising:
   receiving input audio data (x) comprising a time-series of amplitude values;
   transforming the input audio data (x) into an input frequency band decomposition (X1) of the input audio data (x);
   transforming the input frequency band decomposition (X1) into a first latent representation (Z);
   processing the first latent representation (Z) by a first deep neural network to obtain a second latent representation (Z^, Z1^);
   transforming the second latent representation (Z^, Z1^) to obtain a discrete approximation (X3^);
   element-wise multiplying the discrete approximation (X3^) and a residual feature map (R, X5^) to obtain a modified feature map, wherein the residual feature map (R, X5^) is derived from the input frequency band decomposition (X1);
   processing a pre-shaped frequency band decomposition by a waveshaping unit to obtain a waveshaped frequency band decomposition (X1^, X1.2^), wherein the pre-shaped frequency band decomposition is derived from the input frequency band decomposition (X1), wherein the waveshaping unit comprises a second deep neural network;
   summing the waveshaped frequency band decomposition (X1^, X1.2^) and a modified frequency band decomposition (X2^, X1.1^) to obtain a summation output (X0^), wherein the modified frequency band decomposition (X2^, X1.1^) is derived from the modified feature map; and
   transforming the summation output (X0^) to obtain target audio data (y^).

2. The method of claim 1, wherein transforming the input audio data (x) into the input frequency band decomposition (X1) comprises convolving the input audio data (x) with kernel matrix (W1).

3. The method of claim 1, wherein transforming the input audio data (x) into the input frequency band decomposition (X1) comprises convolving the input audio data (x) with kernel matrix (W1); wherein transforming the summation output (X0^) to obtain the target audio data (y^) comprises convolving the summation output (X0^) with the transpose of the kernel matrix (W1T).

4. The method of claim 1, wherein transforming the input frequency band decomposition (X1) into the first latent representation (Z) comprises locally-connected convolving the absolute value (|X1|) of the input frequency band decomposition (X1) with a weight matrix (W2) to obtain a feature map (X2); and max-pooling the feature map (X2) to obtain the first latent representation (Z).

5. The method of claim 1, wherein the waveshaping unit further comprises a locally connected smooth adaptive activation function layer following the second deep neural network.

6. The method of claim 1, wherein the waveshaping unit further comprises a locally connected smooth adaptive activation function layer following the second deep neural network; wherein the waveshaping unit further comprises a first squeeze-and-excitation layer following the locally connected smooth adaptive activation function layer.

7. The method of claim 1, wherein at least one of the waveshaped frequency band decomposition (X1^, X1.2^) and the modified frequency band decomposition (X2^, X1.1^) is scaled by a gain factor (se, se1, se2) before summing to produce the summation output (X0^).

8. The method of claim 1, wherein the second deep neural network comprises first to fourth dense layers.

9. The method of claim 1,
   wherein the waveshaping unit further comprises a locally connected smooth adaptive activation function layer following the second deep neural network;
   wherein the waveshaping unit further comprises a first squeeze-and-excitation layer following the locally connected smooth adaptive activation function layer;

wherein, in the waveshaping unit, the first squeeze-and-excitation layer comprises an absolute value layer preceding a global average pooling operation.

10. The method of claim 1, further comprising:
passing on the input frequency band decomposition (X1) as the residual feature map (R);
passing on the modified feature map as the pre-shaped frequency band decomposition; and
passing on the modified feature map as the modified frequency band decomposition (X2ˆ, X1.1ˆ).

11. The method of claim 1, further comprising:
passing on the input frequency band decomposition (X1) as the residual feature map (R);
passing on the modified feature map as the pre-shaped frequency band decomposition; and
passing on the modified feature map as the modified frequency band decomposition (X2ˆ, X1.1ˆ);
wherein the first deep neural network comprises a plurality of bidirectional long short-term memory layers.

12. The method of claim 1, further comprising:
passing on the input frequency band decomposition (X1) as the residual feature map (R);
passing on the modified feature map as the pre-shaped frequency band decomposition; and
passing on the modified feature map as the modified frequency band decomposition (X2ˆ, X1.1ˆ);
wherein the first deep neural network comprises a plurality of bidirectional long short-term memory layers;
wherein the plurality of bidirectional long short-term memory layers comprises first, second and third bidirectional long short-term memory layers.

13. The method of claim 1, further comprising:
passing on the input frequency band decomposition (X1) as the residual feature map (R);
passing on the modified feature map as the pre-shaped frequency band decomposition; and
passing on the modified feature map as the modified frequency band decomposition (X2ˆ, X1.1ˆ);
wherein the first deep neural network comprises a plurality of bidirectional long short-term memory layers;
wherein the plurality of bidirectional long short-term memory layers is followed by a plurality of smooth adaptive activation function layers.

14. The method of claim 1, further comprising:
passing on the input frequency band decomposition (X1) as the residual feature map (R);
passing on the modified feature map as the pre-shaped frequency band decomposition; and
passing on the modified feature map as the modified frequency band decomposition (X2ˆ, X1.1ˆ);
wherein the first deep neural network comprises a plurality of bidirectional long short-term memory layers;
wherein the first deep neural network comprises a feedforward WaveNet comprising a plurality of layers.

15. The method of claim 1,
wherein the first deep neural network comprises a plurality of shared bidirectional long short-term memory layers, followed by, in parallel, first and second independent bidirectional long short-term memory layers;
wherein the second latent representation (Z1ˆ) is derived from the output of the first independent bidirectional long short-term memory layer;
wherein, in the waveshaping unit, the first squeeze-and-excitation layer further comprises a long short-term memory layer;
wherein the method further comprises:
passing on the input frequency band decomposition (X1) as the pre-shaped frequency band decomposition;
processing the first latent representation (Z) using the second independent bidirectional long short-term memory layer to obtain a third latent representation (Z2ˆ);
processing the third latent representation (Z2ˆ) using a sparse finite impulse response layer to obtain a fourth latent representation (Z3ˆ);
convolving the frequency band representation (X1) with the fourth latent representation (Z3ˆ) to obtain said residual feature map (X5ˆ); and
processing the modified feature map by a second squeeze-and-excitation layer comprising a long short-term memory layer to obtain said modified frequency band decomposition (X2ˆ, X1.1ˆ).

16. The method of claim 1,
wherein the first deep neural network comprises a plurality of shared bidirectional long short-term memory layers, followed by, in parallel, first and second independent bidirectional long short-term memory layers;
wherein the second latent representation (Z1ˆ) is derived from the output of the first independent bidirectional long short-term memory layer;
wherein, in the waveshaping unit, the first squeeze-and-excitation layer further comprises a long short-term memory layer;
wherein the method further comprises:
passing on the input frequency band decomposition (X1) as the pre-shaped frequency band decomposition;
processing the first latent representation (Z) using the second independent bidirectional long short-term memory layer to obtain a third latent representation (Z2ˆ);
processing the third latent representation (Z2ˆ) using a sparse finite impulse response layer to obtain a fourth latent representation (Z3ˆ);
convolving the frequency band representation (X1) with the fourth latent representation (Z3ˆ) to obtain said residual feature map (X5ˆ); and
processing the modified feature map by a second squeeze-and-excitation layer comprising a long short-term memory layer to obtain said modified frequency band decomposition (X2ˆ, X1.1 ˆ);
wherein the plurality of shared bidirectional long short-term memory layers comprises first and second shared bidirectional long short-term memory layers.

17. The method of claim 1,
wherein the first deep neural network comprises a plurality of shared bidirectional long short-term memory layers, followed by, in parallel, first and second independent bidirectional long short-term memory layers;
wherein the second latent representation (Z1ˆ) is derived from the output of the first independent bidirectional long short-term memory layer;
wherein, in the waveshaping unit, the first squeeze-and-excitation layer further comprises a long short-term memory layer;
wherein the method further comprises:
passing on the input frequency band decomposition (X1) as the pre-shaped frequency band decomposition;
processing the first latent representation (Z) using the second independent bidirectional long short-term memory layer to obtain a third latent representation (Z2ˆ);

processing the third latent representation (Z2ˆ) using a sparse finite impulse response layer to obtain a fourth latent representation (Z3ˆ);

convolving the frequency band representation (X1) with the fourth latent representation (Z3ˆ) to obtain said residual feature map (X5ˆ); and processing the modified feature map by a second squeeze-and-excitation layer comprising a long short-term memory layer to obtain said modified frequency band decomposition (X2ˆ, X1.1ˆ)

wherein each of the first and second independent bidirectional long short-term memory layers comprises 16 units.

18. The method of claim 1, wherein the first deep neural network comprises a plurality of shared bidirectional long short-term memory layers, followed by, in parallel, first and second independent bidirectional long short-term memory layers;

wherein the second latent representation (Z1ˆ) is derived from the output of the first independent bidirectional long short-term memory layer;

wherein, in the waveshaping unit, the first squeeze-and-excitation layer further comprises a long short-term memory layer;

wherein the method further comprises:

passing on the input frequency band decomposition (X1) as the pre-shaped frequency band decomposition;

processing the first latent representation (Z) using the second independent bidirectional long short-term memory layer to obtain a third latent representation (Z2ˆ);

processing the third latent representation (Z2ˆ) using a sparse finite impulse response layer to obtain a fourth latent representation (Z3ˆ);

convolving the frequency band representation (X1) with the fourth latent representation (Z3 ˆ) to obtain said residual feature map (X5ˆ); and processing the modified feature map by a second squeeze-and-excitation layer comprising a long short-term memory layer to obtain said modified frequency band decomposition (X2ˆ, X1.1ˆ);

wherein the sparse finite impulse response layer comprises:

first and second independent dense layers taking the third latent representation (Z2ˆ) as input; and a sparse tensor taking the respective output of the first and second independent dense layers as inputs, the output of the sparse tensor being the fourth latent representation (Z3ˆ).

19. A non-transitory computer-readable medium having stored thereon a computer program comprising instructions which, when the computer program is executed by a computer, cause the computer to perform a method of processing audio data, the method comprising:

receiving input audio data (x) comprising a time-series of amplitude values;

transforming the input audio data (x) into an input frequency band decomposition (X1) of the input audio data (x);

transforming the input frequency band decomposition (X1) into a first latent representation (Z);

processing the first latent representation (Z) by a first deep neural network to obtain a second latent representation (Zˆ, Z1ˆ);

transforming the second latent representation (Zˆ, Z1ˆ) to obtain a discrete approximation (X3ˆ);

element-wise multiplying the discrete approximation (X3ˆ) and a residual feature map (R, X5ˆ) to obtain a modified feature map, wherein the residual feature map (R, X5ˆ) is derived from the input frequency band decomposition (X1);

processing a pre-shaped frequency band decomposition by a waveshaping unit to obtain a waveshaped frequency band decomposition (X1ˆ, X1.2ˆ), wherein the pre-shaped frequency band decomposition is derived from the input frequency band decomposition (X1), wherein the waveshaping unit comprises a second deep neural network;

summing the waveshaped frequency band decomposition (X1ˆ, X1.2ˆ) and a modified frequency band decomposition (X2 ˆ, X1.1ˆ) to obtain a summation output (X0ˆ), wherein the modified frequency band decomposition (X2ˆ, X1.1ˆ) is derived from the modified feature map; and transforming the summation output (X0ˆ) to obtain target audio data (yˆ).

20. An audio data processing device comprising a processor configured to perform the method of processing audio data, the method comprising:

receiving input audio data (x) comprising a time-series of amplitude values;

transforming the input audio data (x) into an input frequency band decomposition (X1) of the input audio data (x);

transforming the input frequency band decomposition (X1) into a first latent representation (Z);

processing the first latent representation (Z) by a first deep neural network to obtain a second latent representation (Zˆ, Z1ˆ);

transforming the second latent representation (Zˆ, Z1ˆ) to obtain a discrete approximation (X3ˆ);

element-wise multiplying the discrete approximation (X3ˆ) and a residual feature map (R, X5ˆ) to obtain a modified feature map, wherein the residual feature map (R, X5ˆ) is derived from the input frequency band decomposition (X1);

processing a pre-shaped frequency band decomposition by a waveshaping unit to obtain a waveshaped frequency band decomposition (X1ˆ, X1.2ˆ), wherein the pre-shaped frequency band decomposition is derived from the input frequency band decomposition (X1), wherein the waveshaping unit comprises a second deep neural network;

summing the waveshaped frequency band decomposition (X1ˆ, X1.2ˆ) and a modified frequency band decomposition (X2ˆ, X1.1ˆ) to obtain a summation output (X0ˆ), wherein the modified frequency band decomposition (X2ˆ, X1.1ˆ) is derived from the modified feature map; and transforming the summation output (X0ˆ) to obtain target audio data (yˆ).

* * * * *